(12) United States Patent
Liu et al.

(10) Patent No.: US 11,843,485 B2
(45) Date of Patent: Dec. 12, 2023

(54) SYMBOL PROCESSING METHOD AND APPARATUS

(71) Applicant: HUAWEI TECHNOLOGIES CO., LTD., Guangdong (CN)

(72) Inventors: Fengwei Liu, Chengdu (CN); Qianli Ma, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/731,326

(22) Filed: Apr. 28, 2022

(65) Prior Publication Data
US 2022/0263693 A1    Aug. 18, 2022

Related U.S. Application Data

(63) Continuation of application No. PCT/CN2019/115142, filed on Nov. 1, 2019.

(51) Int. Cl.
*H04L 25/08* (2006.01)
*H04L 27/26* (2006.01)

(52) U.S. Cl.
CPC .......... *H04L 25/08* (2013.01); *H04L 27/2607* (2013.01)

(58) Field of Classification Search
CPC .. H04L 25/08; H04L 27/2607; H04L 27/2608
USPC .................................. 375/219–222
See application file for complete search history.

(56) References Cited

U.S. PATENT DOCUMENTS

| | | | | |
|---|---|---|---|---|
| 7,778,336 B1 * | 8/2010 | Toumpakaris | ...... | H04L 27/2659 375/372 |
| 8,848,742 B2 * | 9/2014 | Zhang | ........ | H04L 27/2607 370/476 |
| 10,070,436 B2 * | 9/2018 | Ahn | ........ | H04W 56/003 |
| 10,461,975 B2 * | 10/2019 | Chen | ........ | H04W 72/1263 |
| 2010/0309775 A1 * | 12/2010 | Muharemovic | ........ | C07K 14/35 370/210 |
| 2016/0099824 A1 | 4/2016 | Javier et al. | | |

(Continued)

FOREIGN PATENT DOCUMENTS

| | | |
|---|---|---|
| CN | 1881968 A | 12/2006 |
| CN | 102067540 A | 5/2011 |
| CN | 102197628 A | 9/2011 |

(Continued)

OTHER PUBLICATIONS

Ericsson, "NPRACH range enhancements for NB-IoT," 3GPP TSG-RAN WG1 #91, R1-1719368, Reno, USA, Nov. 27-Dec. 1, 2017, 10 pages.

(Continued)

*Primary Examiner* — Emmanuel Bayard
(74) *Attorney, Agent, or Firm* — Fish & Richardson P.C.

(57) ABSTRACT

This application provides example symbol processing methods and apparatuses. One example method includes generating a first symbol in a symbol sequence, where the first symbol and a second symbol have a same first symbol component, a start location of the first symbol component in the first symbol is a start location of the first symbol, a start location of the first symbol component in the second symbol is a location at which a cyclic prefix is truncated in the second symbol, the second symbol is a next symbol adjacent to the first symbol, and the first symbol and the second symbol each has a cyclic prefix. The first symbol can then be sent.

20 Claims, 19 Drawing Sheets

(56) References Cited

U.S. PATENT DOCUMENTS

2017/0331658 A1* 11/2017 Chen ................. H04W 72/1263
2018/0097671 A1* 4/2018 Huang ................. H04L 5/0048

FOREIGN PATENT DOCUMENTS

| CN | 107852254 A | 3/2018 |
|----|----|----|
| CN | 108366028 A | 8/2018 |
| EP | 3002920 A1 | 4/2016 |
| WO | 2008056901 A1 | 5/2008 |
| WO | 2009021244 A2 | 2/2009 |
| WO | 2018175178 A1 | 9/2018 |

OTHER PUBLICATIONS

PCT International Search Report and Written Opinion issued in International Application No. PCT/CN2019/115142 dated Jul. 24, 2020, 15 pages (with English translation).
Samsung, "Symbol alignment for different CP overhead," 3GPP TSG RAN WG1 Meeting #87, R1-1612444, Reno, USA Nov. 14-18, 2016, 3 pages.
Extended European Search Report issued in European Application No. 19950712.0 dated Sep. 5, 2022, 12 pages.
Ith et al., "Pre-DFT Multiplexing of RS and UCI/Data for Short Duration PUCCH," 3GPP TSG RAN WG1 Meeting #88Bis, R1-1704783, Spokane, USA, Apr. 3-7, 2017, 8 pages.
Office Action in Chinese Appln. No. 201980101452.X, dated Mar. 4, 2023, 5 pages.

* cited by examiner

Case 1: A maximum multipath delay does not exceed a CP length

Case 2: A maximum multipath delay exceeds a CP length $L_{CP}$ represents an equivalent length of a CP length in a time domain vector before DFT

SYMBOL PROCESSING METHOD AND APPARATUS

CROSS-REFERENCE TO RELATED APPLICATIONS

This application is a continuation of International Application No. PCT/CN2019/115142, filed on Nov. 1, 2019, the disclosure of which is hereby incorporated by reference in its entirety.

TECHNICAL FIELD

This application relates to the communication field, and specifically, to a symbol processing method and apparatus.

BACKGROUND

To resist a multipath effect of a channel, a technology of adding a guard interval between symbols is proposed. First, the guard interval can remove intersymbol interference (ISI) between adjacent symbols. Second, after a transmitted symbol passes through a multipath channel, the guard interval converts a linear convolution of the channel and the transmitted symbol into a cyclic convolution of the channel and the transmitted symbol, so that a symbol receive end can eliminate the multipath effect of the channel by using a frequency domain equalization method.

Usually, a cyclic prefix (CP) is used as the guard interval between the symbols. The cyclic prefix is a cyclic structure formed by copying a segment of data at the end (which is alternatively referred to as a tail) of a data symbol to the start (which is alternatively referred to as a header) of the symbol.

In the conventional technology, to implement flexible multi-user multiplexing (for example, frequency division multiplexing, space division multiplexing, or time division multiplexing), cyclic prefixes having a same length are configured for different users. It is considered that the different users are in different channel conditions. To ensure reception performance of transmitted symbols of the users in the different channel conditions, in the conventional technology, a cyclic prefix length greater than a maximum multipath delay of a large-delay user is selected as a uniform length of the cyclic prefixes. However, for a low-delay user, an excessively long cyclic prefix causes unnecessary bandwidth overheads or an unnecessary transmission rate loss.

Therefore, in the conventional technology, the guard interval between the symbols cannot be flexibly configured based on a user requirement.

SUMMARY

This application provides a symbol processing method and apparatus, to flexibly configure a guard interval between symbols without depending on a length of a cyclic prefix.

According to a first aspect, a symbol processing method is provided. The method includes: generating a first transmitted symbol in a transmitted symbol sequence, where the first transmitted symbol and a second transmitted symbol have a same first symbol component; a start location of the first symbol component in the first transmitted symbol is a start location of the first transmitted symbol; a start location of the first symbol component in the second transmitted symbol is a location at which a cyclic prefix is truncated in the second transmitted symbol; the second transmitted symbol is a next transmitted symbol adjacent to the first transmitted symbol; and the first transmitted symbol and the second transmitted symbol each has a cyclic prefix; and sending the first transmitted symbol.

Optionally, a receive end determines a first receive window used to receive the first transmitted symbol, and adjusts start time of the first receive window, so that the first receive window can completely receive the first transmitted symbol; and receives the first transmitted symbol by using an adjusted first receive window.

It should be understood that the first transmitted symbol and the next transmitted symbol adjacent to the first transmitted symbol are enabled to have the same first symbol component, and the receive window for the first transmitted symbol is adjusted, to reduce or overcome interference caused by a multipath effect.

It should further be understood that, when a maximum multipath delay is large, the interference caused by the multipath effect can be reduced or overcome by increasing a length of the first symbol component. For example, when the maximum multipath delay is large, the adjusted start time of the receive window for the first transmitted symbol may correspondingly increase by increasing the length of the first symbol component, so that the receive window for the first transmitted symbol does not include another transmitted symbol. In addition, the first transmitted symbol can be completely received in the receive window for the first transmitted symbol, to reduce or overcome the interference caused by the multipath effect.

It should further be understood that, in this application, the interference caused by the multipath effect can be reduced or overcome without depending on a length of the cyclic prefix. Therefore, in this application, a length of a guard interval between symbols can be flexibly implemented based on requirements of users in different channel conditions.

A manner in which the receive end receives the first transmitted symbol is not limited in this application. The receive end may determine, based on an application requirement, a manner of receiving the first transmitted symbol.

Optionally, the first transmitted symbol and the second transmitted symbol may represent any two adjacent transmitted symbols in the transmitted symbol sequence. In other words, the first transmitted symbol may represent a previous one of any two adjacent transmitted symbols in the transmitted symbol sequence.

Optionally, the first transmitted symbol represents the $1^{st}$ transmitted symbol in the transmitted symbol sequence. To be specific, the first transmitted symbol and the second transmitted symbol may represent the $1^{st}$ transmitted symbol and the $2^{nd}$ transmitted symbol in the transmitted symbol sequence.

With reference to the first aspect, in a possible implementation of the first aspect, the method further includes: generating a third transmitted symbol in the transmitted symbol sequence, where the third transmitted symbol and a fourth transmitted symbol have a same second symbol component; an end location of the second symbol component in the third transmitted symbol is a location at which a cyclic prefix is truncated in the third transmitted symbol; an end location of the second symbol component in the fourth transmitted symbol is an end location of the fourth transmitted symbol; the fourth transmitted symbol is a previous transmitted symbol adjacent to the third transmitted symbol; and the third transmitted symbol and the fourth transmitted symbol each has a cyclic prefix; and sending the third transmitted symbol.

It should be understood that the third transmitted symbol and the previous transmitted symbol adjacent to the third transmitted symbol are enabled to have the same second symbol component, to flexibly set the guard interval between the symbols without depending on the CP length.

In addition, because the guard interval can be set without depending on the CP length, a transmitted symbol provided in this application may support (frequency division, space division, and time division) multiplexing between users having different subcarrier spacings and/or CP types.

The fourth transmitted symbol and the third transmitted symbol may represent any two adjacent transmitted symbols in the transmitted symbol sequence. In other words, the third transmitted symbol may represent a next one of any two adjacent transmitted symbols in the transmitted symbol sequence.

When the first transmitted symbol is not the $1^{st}$ transmitted symbol in the transmitted symbol sequence, the third transmitted symbol and the first transmitted symbol may be a same transmitted symbol.

Optionally, the first transmitted symbol and the second transmitted symbol further have the same second symbol component. An end location of the second symbol component in the first transmitted symbol is an end location of the first transmitted symbol, and an end location of the second symbol component in the second transmitted symbol is the location at which the CP is truncated in the second transmitted symbol.

With reference to the first aspect, in a possible implementation of the first aspect, the transmitted symbol sequence is a transmitted symbol sequence including a plurality of transmitted subsymbols obtained through processing based on a single transmitted symbol.

With reference to the first aspect, in a possible implementation of the first aspect, at least one transmitted subsymbol in the transmitted symbol sequence is a channel demodulation reference signal.

With reference to the first aspect, in a possible implementation of the first aspect, the generating a first transmitted symbol in a transmitted symbol sequence includes: obtaining a plurality of complex-valued symbols; dividing the plurality of complex-valued symbols into a plurality of sets, where each set corresponds to one transmitted symbol, and the plurality of sets include a first set corresponding to the first transmitted symbol and a second set corresponding to the second transmitted symbol; performing a copying operation on the first set and the second set, so that the first set and the second set have a part of same complex-valued symbols; and generating the first transmitted symbol based on the first set.

With reference to the first aspect, in a possible implementation of the first aspect, the transmitted symbol sequence is a transmitted symbol sequence including a plurality of transmitted subsymbols obtained through processing based on a single transmitted symbol. When the first transmitted symbol is not the $1^{st}$ transmitted symbol in the transmit sequence, the cyclic prefix of the first transmitted symbol is added before discrete Fourier transformation (DFT) is performed on the first set.

With reference to the first aspect, in a possible implementation of the first aspect, the transmitted symbol sequence is a transmitted symbol sequence including a plurality of transmitted subsymbols obtained through processing based on a single transmitted symbol. When the first transmitted symbol is the $1^{st}$ transmitted symbol in the transmit sequence, the cyclic prefix of the first transmitted symbol is added after discrete Fourier transformation (DFT) is performed on the first set.

According to a second aspect, a symbol processing method is provided. The method includes: determining a first receive window used to receive a first transmitted symbol in a transmitted symbol sequence, where the first transmitted symbol and a second transmitted symbol have a same first symbol component; a start location of the first symbol component in the first transmitted symbol is a start location of the first transmitted symbol; a start location of the first symbol component in the second transmitted symbol is a location at which a cyclic prefix is truncated in the second transmitted symbol; the second transmitted symbol is a next transmitted symbol adjacent to the first transmitted symbol; and the first transmitted symbol and the second transmitted symbol each has a cyclic prefix; adjusting start time of the first receive window, so that the first receive window can completely receive the first transmitted symbol; and receiving the first transmitted symbol by using an adjusted first receive window.

It should be understood that the first transmitted symbol and the next transmitted symbol adjacent to the first transmitted symbol are enabled to have the same first symbol component, and the receive window for the first transmitted symbol is adjusted, to reduce or overcome interference caused by a multipath effect.

It should further be understood that, when a maximum multipath delay is large, the interference caused by the multipath effect can be reduced or overcome by increasing a length of the first symbol component. For example, when the maximum multipath delay is large, the adjusted start time of the receive window for the first transmitted symbol may correspondingly increase by increasing the length of the first symbol component, so that the receive window for the first transmitted symbol does not include another transmitted symbol. In addition, the first transmitted symbol can be completely received in the receive window for the first transmitted symbol, to reduce or overcome the interference caused by the multipath effect.

It should further be understood that, in this application, the interference caused by the multipath effect can be reduced or overcome without depending on a length of a cyclic prefix. Therefore, in this application, a length of a guard interval between symbols can be flexibly implemented based on requirements of users in different channel conditions.

A manner in which a receive end receives the first transmitted symbol is not limited in this application. The receive end may determine, based on an application requirement, a manner of receiving the first transmitted symbol.

With reference to the second aspect, in a possible implementation of the second aspect, the adjusting start time of the first receive window includes: shifting the start time of the first receive window backward by a first step. The first step is not greater than a length of the first symbol component.

With reference to the second aspect, in a possible implementation of the second aspect, the first transmitted symbol is the $1^{st}$ transmitted symbol in the transmitted symbol sequence.

With reference to the second aspect, in a possible implementation of the second aspect, The method further includes: determining a third receive window used to receive a third transmitted symbol in the transmitted symbol sequence, where the third transmitted symbol and a fourth transmitted symbol have a same second symbol component; an end location of the second symbol component in the third transmitted symbol is a location at which a cyclic prefix is truncated in the third transmitted symbol; an end location of the second symbol component in the fourth transmitted symbol is an end location of the fourth transmitted symbol; the fourth transmitted symbol is a previous transmitted symbol adjacent to the third transmitted symbol; and the third transmitted symbol and the fourth transmitted symbol each has a cyclic prefix; and receiving the third transmitted symbol by using the third receive window.

With reference to the second aspect, in a possible implementation of the second aspect, the transmitted symbol sequence is a transmitted symbol sequence including a plurality of transmitted subsymbols obtained through processing based on a single transmitted symbol.

With reference to the second aspect, in a possible implementation of the second aspect, at least one transmitted subsymbol in the transmitted symbol sequence is a channel demodulation reference signal.

According to a third aspect, a symbol processing method is provided. The method includes: generating a first transmitted subsymbol in a transmitted symbol sequence, where the transmitted symbol sequence is a transmitted symbol sequence including a plurality of transmitted subsymbols obtained through processing based on a single transmitted symbol; and sending the first transmitted subsymbol.

The first transmitted subsymbol and a second transmitted subsymbol have a same first symbol component; a start location of the first symbol component in the first transmitted subsymbol is a start location of the first transmitted symbol; a start location of the first symbol component in the second transmitted subsymbol is a location at which a cyclic prefix is truncated in the second transmitted symbol; the second transmitted subsymbol is a next transmitted symbol adjacent to the first transmitted subsymbol; and the first transmitted subsymbol and the second transmitted subsymbol each has a cyclic prefix; and/or the first transmitted subsymbol and a third transmitted subsymbol have a same second symbol component; an end location of the second symbol component in the first transmitted subsymbol is a location at which a cyclic prefix is truncated in the first transmitted subsymbol; an end location of the second symbol component in the third transmitted subsymbol is an end location of the third transmitted subsymbol; the third transmitted subsymbol is a previous transmitted symbol adjacent to the first transmitted subsymbol; and the first transmitted subsymbol and the third transmitted subsymbol each has a cyclic prefix.

It should be understood that the first transmitted symbol and the next transmitted symbol adjacent to the first transmitted symbol are enabled to have the same first symbol component, and a receive window for the first transmitted symbol is adjusted, to reduce or overcome interference caused by a multipath effect. The first transmitted symbol and the previous transmitted symbol adjacent to the third transmitted symbol are enabled to have the same second symbol component, to flexibly set a guard interval between symbols without depending on a CP length.

For a transmitted symbol sequence including a plurality of transmitted subsymbols obtained through processing based on a single transmitted symbol, a guard interval of each transmitted subsymbol in the transmitted symbol sequence can be flexibly set.

With reference to the third aspect, in a possible implementation of the third aspect, the first transmitted subsymbol is the $1^{st}$ transmitted subsymbol in the transmitted symbol sequence.

With reference to the third aspect, in a possible implementation of the third aspect, when the first transmitted subsymbol is not the $1^{st}$ transmitted subsymbol in the transmit sequence, the first transmitted subsymbol does not include the first symbol component.

With reference to the third aspect, in a possible implementation of the third aspect, the generating a first transmitted subsymbol in a transmitted symbol sequence includes: obtaining a plurality of complex-valued symbols; dividing the plurality of complex-valued symbols into a plurality of sets, where each set corresponds to one transmitted symbol, and the plurality of sets include a first set corresponding to the first transmitted symbol and a second set corresponding to the second transmitted symbol; performing a copying operation on the first set and the second set, so that the first set and the second set have a part of same complex-valued symbols; and generate the first transmitted subsymbol based on the first set.

With reference to the third aspect, in a possible implementation of the third aspect, when the first transmitted subsymbol is not the $1^{st}$ transmitted subsymbol in the transmit sequence, the cyclic prefix of the first transmitted subsymbol is added before discrete Fourier transformation (DFT) is performed on the first set.

With reference to the third aspect, in a possible implementation of the third aspect, when the first transmitted subsymbol is the $1^{st}$ transmitted subsymbol in the transmit sequence, the cyclic prefix of the first transmitted subsymbol is added after discrete Fourier transformation (DFT) is performed on the first set.

According to a fourth aspect, a symbol processing apparatus is provided. The communication apparatus is configured to perform the method provided in the first aspect, the second aspect, or the third aspect.

Optionally, the apparatus may include a module configured to perform the method provided in the first aspect, the second aspect, or the third aspect.

According to a fifth aspect, a communication apparatus is provided. The communication apparatus includes a processor. The processor is coupled to a memory. The memory is configured to store a computer program or instructions. The processor is configured to execute the computer program or the instructions stored in the memory, to perform the method according to the first aspect, the second aspect, or the third aspect.

For example, the processor is configured to execute the computer program or the instructions stored in the memory, so that the communication apparatus performs the method according to the first aspect, the second aspect, or the third aspect.

Optionally, the communication apparatus includes one or more processors.

Optionally, the communication apparatus may further include a memory coupled to the processor.

Optionally, the communication apparatus includes one or more memories.

Optionally, the memory and the processor may be integrated together, or disposed separately.

Optionally, the communication apparatus may further include a transceiver.

According to a sixth aspect, a chip is provided. The chip includes a processing module and a communication interface. The processing module is configured to control the communication interface to communicate with the outside. The processing module is further configured to implement the method provided in the first aspect, the second aspect, or the third aspect.

According to a seventh aspect, a computer-readable storage medium is provided. The computer-readable storage medium stores a computer program. When the computer program is executed by a computer, the computer is enabled to implement the method provided in the first aspect, the second aspect, or the third aspect.

According to an eighth aspect, a computer program product including instructions is provided. When the instructions are executed by a computer, the computer is enabled to implement the method provided in the first aspect, the second aspect, or the third aspect.

Based on the foregoing descriptions, in this application, two adjacent transmitted symbols are enabled to have a part of same symbol components, to reduce or overcome interference caused by a multipath effect without depending on a length of a cyclic prefix. Therefore, in this application, a length of a guard interval between symbols can be flexibly implemented based on requirements of user in different channel conditions.

DESCRIPTION OF EMBODIMENTS

The following describes the technical solutions of this application with reference to the accompanying drawings.

In the conventional technology, a plurality of guard intervals may be used to resist a multipath effect of a channel, for example, a cyclic prefix (CP), a unique word (UW), and a zero tail (ZT). For example, in both a long term evolution (LTE) system and a 5th generation (5G) system, the cyclic prefix is used as a guard interval between symbols for a single-carrier waveform. The single-carrier waveform includes but is not limited to a discrete Fourier transformation-spread-orthogonal frequency division multiplexing (DFT-s-OFDM) waveform and a single carrier-quadrature amplitude modulation (SC-QAM) waveform.

This application relates to a cyclic prefix that is used as a guard interval between symbols.

Figure 1:
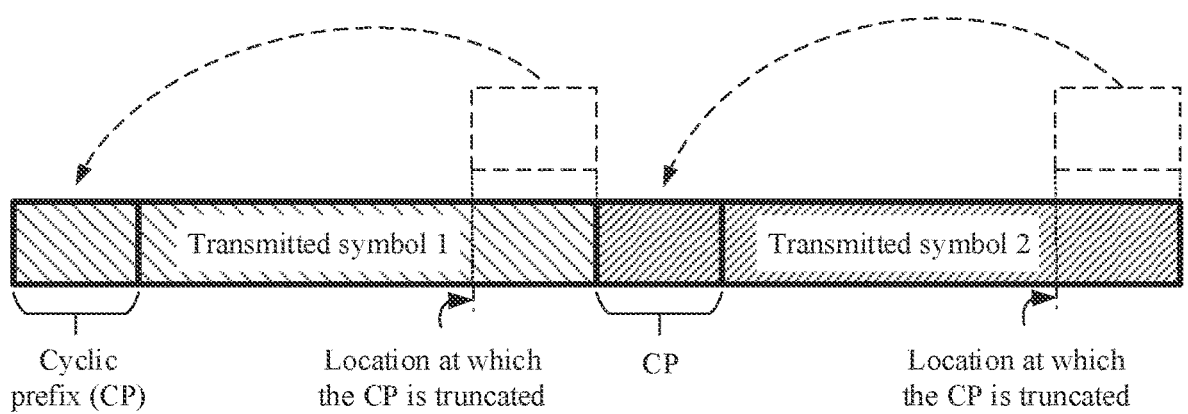
FIG. 1 and FIG. 2 are schematic diagrams in which a cyclic prefix (CP) is used as a guard interval between symbols.

The cyclic prefix is used as the guard interval between the symbols by copying a sampling point (which may also be referred to as a symbol component) at the end of a transmitted symbol to the start of the transmitted symbol, as shown in FIG. 1.

FIG. 1 is a schematic diagram of a time domain structure in which a cyclic prefix (which is denoted as a CP below) is used as a guard interval between symbols. A CP of a transmitted symbol 1 refers to a cyclic structure formed by copying a symbol component between a location at which the CP is truncated and an end location in the transmitted symbol 1 to the start of the transmitted symbol 1. Similarly, a CP of a transmitted symbol 2 refers to a cyclic structure formed by copying a symbol component between a location at which the CP is truncated and an end location in the transmitted symbol 2 to the start of the transmitted symbol 2. The transmitted symbol 1 and the transmitted symbol 2 shown in FIG. 1 are two transmitted symbols that are adjacent to each other. The CP of the transmitted symbol 2 may be used as a guard interval between the transmitted symbol 1 and the transmitted symbol 2. The CP of the transmitted symbol 1 may be used as a guard interval between the transmitted symbol 1 and a transmitted symbol (not shown in FIG. 1) before the transmitted symbol 1.

A multipath effect of a channel may cause intersymbol interference (ISI), and may further cause interchannel interference (ICI). The interchannel interference may also be referred to as inter-carrier interference.

In the conventional technology, to overcome the ISI and the ICI that are caused by the multipath effect, the cyclic prefix needs to meet the following two conditions.

Condition (1): A length of the cyclic prefix is not less than a maximum multipath delay.

If Condition (1) is met, the ISI can be removed.

Condition (2): The cyclic prefix needs to ensure that a transmitted symbol can be completely received in a receive window for the transmitted symbol.

If Condition (2) is met, the ICI can be removed. A reason is that a receive window for a transmitted symbol includes a complete waveform of the transmitted symbol, so that after the transmitted symbol is transmitted to a receive end through a multipath channel, a linear convolution of the transmitted symbol and the channel may be converted into a cyclic convolution of the transmitted symbol and the channel. In this way, the receive end may use a frequency domain equalization method to eliminate the multipath effect of the channel.

Figure 2:
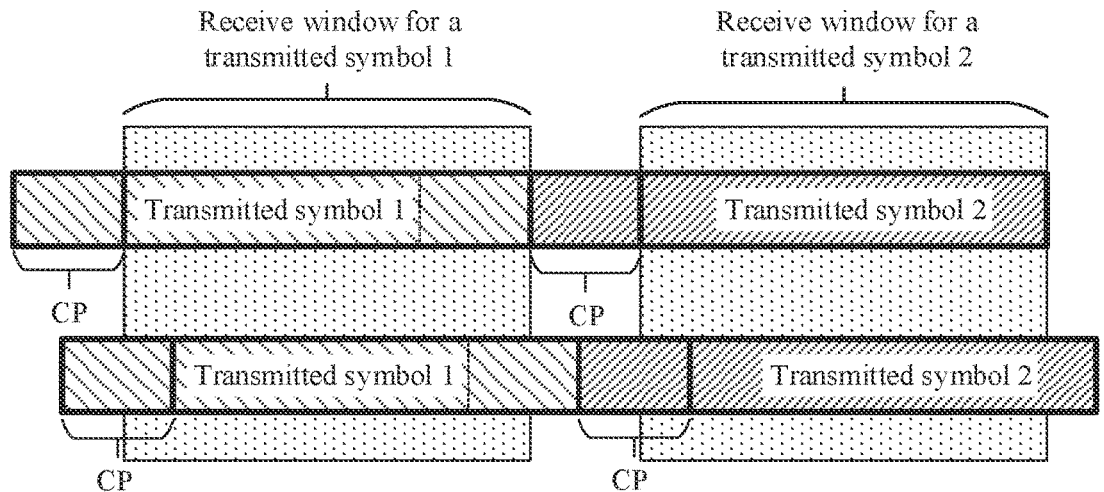
Figure 2:
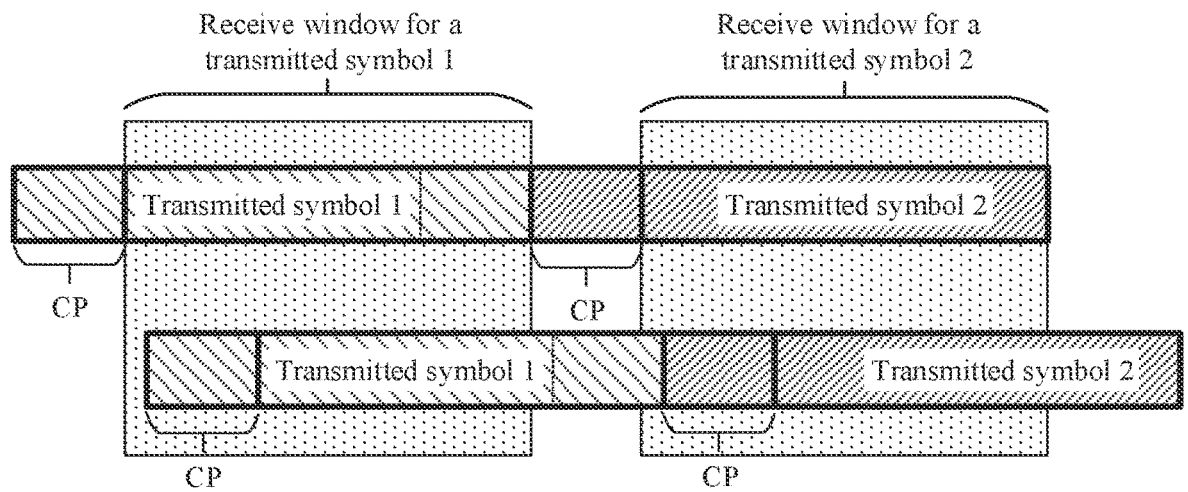

FIG. 2 is a schematic diagram of received signals in two channel conditions. FIG. 2 is only a schematic diagram of a first path and a maximum delay path (which correspond to the two channel conditions). It should be understood that FIG. 2 is merely an example but not a limitation. Case 1 shown in FIG. 2 indicates that a maximum multipath delay of a channel does not exceed a CP length. Case 2 shown in FIG. 2 indicates that a maximum multipath delay of a channel exceeds a CP length.

As shown in FIG. 2, in Case 1, because the maximum multipath delay does not exceed the CP length, a receive window for a transmitted symbol 2 does not include a transmitted symbol 1. Therefore, ISI of the transmitted symbol 1 to the transmitted symbol 2 can be avoided. A receive window for the transmitted symbol 1 does not include a transmitted symbol (not shown in FIG. 2) before the symbol 1 either. Therefore, the transmitted symbol 1 is not affected by ISI either. It may be understood that ISI between adjacent received symbols can be removed when the CP length is not less than the maximum multipath delay.

Still as shown in FIG. 2, in Case 1, a CP of the transmitted symbol 1 can ensure that the receive window for the transmitted symbol 1 includes a complete waveform of the transmitted symbol 1, and a CP of the transmitted symbol 2 can ensure that the receive window for the transmitted symbol 2 includes a complete waveform of the transmitted symbol 2, to remove ICI by using the CP.

Still as shown in FIG. 2, in Case 2, because the maximum multipath delay exceeds the CP length, a receive window for a transmitted symbol 2 includes a symbol component of a transmitted symbol 1. As a result, the transmitted symbol 2 is affected by ISI of the transmitted symbol 1. In addition, in Case 2, a receive window for the transmitted symbol 1 does not include a complete waveform of the transmitted symbol 1, and the receive window for the transmitted symbol 2 does not include a complete waveform of the transmitted symbol 2. Therefore, ICI cannot be removed in Case 2.

It can be learned from Case 1 and Case 2 shown in FIG. 2 that, to overcome ISI and ICI that are caused by a multipath effect, it needs to be ensured that a cyclic prefix is greater than the maximum multipath delay of the channel, and it needs to be ensured that a receive window for a transmitted symbol includes a complete waveform of the transmitted symbol.

In the conventional technology, to implement flexible multi-user multiplexing (for example, frequency division multiplexing, space division multiplexing, or time division multiplexing), cyclic prefixes having a same length are configured for different users. It is considered that the different users are in different channel conditions. To ensure reception performance of transmitted symbols of the users in the different channel conditions, in the conventional technology, a cyclic prefix length greater than a maximum multipath delay of a large-delay user is selected as a uniform length of the cyclic prefixes.

Therefore, in the conventional technology, a long cyclic prefix may be allocated to a low-delay user. Addition of the cyclic prefix causes bandwidth costs, that is, a longer cyclic prefix indicates higher bandwidth costs, or in other words, a longer cyclic prefix indicates a larger transmission rate loss. Therefore, for the low-delay user, an excessively long cyclic prefix causes unnecessary bandwidth overheads or an unnecessary transmission rate loss.

To resolve the foregoing problem, this application provides a symbol processing method and apparatus, to flexibly configure a guard interval between symbols without depending on a length of a cyclic prefix. For example, in this application, ISI and ICI that are caused by a multipath effect can be reduced or overcome for users in different channel conditions when unnecessary bandwidth overheads are avoided.

This application may be applied to various communication systems, for example, a cellular communication system, for example, a long term evolution (LTE) system, evolution of the cellular communication system, a 5th generation (5G) system, a machine-to-machine (M2M) communication system, or another future evolved communication system. A 5G radio air interface technology is referred to as new radio (NR), and the 5G system may also be referred to as an NR system.

This application may be applied to a transmitted symbol of a single-carrier waveform. For example, the single-carrier waveform includes but is not limited to a DFT-s-OFDM waveform and an SC-QAM waveform.

A transmitted symbol of the DFT-s-OFDM waveform may also be referred to as a DFT-s-OFDM symbol. A transmitted symbol of the SC-QAM waveform may also be referred to as an SC-QAM symbol. For example, a transmitted symbol in embodiments of this application may be a DFT-s-OFDM symbol or an SC-QAM symbol.

In embodiments of this application, a transmit end may be a terminal device, and a receive end is a network device. Alternatively, in embodiments of this application, a transmit end may be a network device, and a receive end is a terminal device.

The terminal device in this specification includes a handheld device, a vehicle-mounted device, a wearable device, or a computing device that has a wireless communication function. For example, the terminal device may be user equipment (UE), an access terminal, a subscriber unit, a subscriber station, a mobile station, a remote station, a remote terminal, a mobile device, a user terminal, a terminal, a wireless communication device, a user agent, or a user apparatus. For example, the terminal device may be a mobile phone, a tablet computer, or a computer with a wireless transceiver function. The terminal device may alternatively be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, or the like. The terminal device may be a terminal device in a 5G network, a terminal device in a future evolved public land mobile communication network (PLMN), or the like.

The network device in this specification may be configured to communicate with one or more terminal devices, or may be configured to communicate with one or more base stations having some terminal functions (for example, communicate with a macro base station and a micro base station, for example, an access point). The network device may be referred to as a base station. The base station may be in a plurality of forms, for example, a macro base station, a micro base station, a relay station, and an access point. For example, the network device in embodiments of this application may be a base station in new radio (NR), a base transceiver station (BTS) in a global system for mobile communications (GSM) or code division multiple access (CDMA), a NodeB (NB) in a wideband code division multiple access (WCDMA) system, or an evolved NodeB (eNB or eNodeB) in a long term evolution (LTE) system. The base station in 5G NR may also be referred to as a transmission reception point (TRP) or a next generation NodeB (gNB).

The transmitted symbol in embodiments of this application may be used for uplink transmission or downlink transmission.

A waveform of the transmitted symbol in embodiments of this application includes but is not limited to a DFT-s-OFDM waveform and an SC-QAM waveform.

Figure 3:
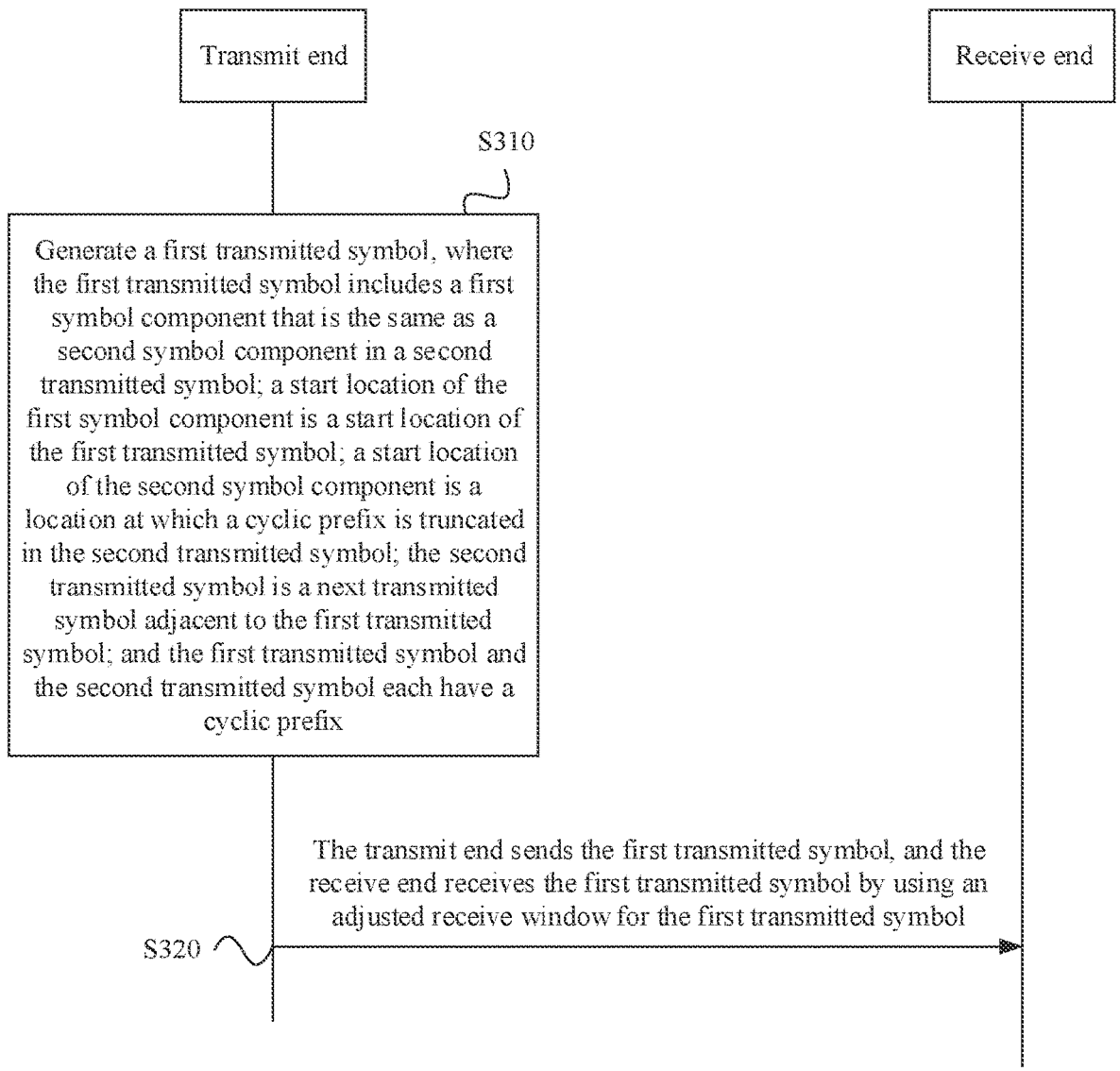
FIG. 3 is a schematic flowchart of a symbol processing method according to an embodiment of this application.

FIG. 3 is a schematic flowchart of a symbol processing method according to an embodiment of this application. The method includes the following steps.

S310: A transmit end generates a first transmitted symbol in a transmitted symbol sequence, where the first transmitted symbol and a second transmitted symbol have a same first symbol component; a start location of the first symbol component in the first transmitted symbol is a start location of the first transmitted symbol; a start location of the first symbol component in the second transmitted symbol is a location at which a cyclic prefix is truncated in the second transmitted symbol; the second transmitted symbol is a next transmitted symbol adjacent to the first transmitted symbol; and the first transmitted symbol and the second transmitted symbol each has a cyclic prefix.

S320: The transmit end sends the first transmitted symbol. Correspondingly, a receive end receives the first transmitted symbol.

Optionally, as shown in FIG. 3, in step S320, the receive end receives the first transmitted symbol by using an adjusted receive window for the first transmitted symbol.

Optionally, before the receive end receives the first transmitted symbol, the method further includes: The receive end determines a first receive window used to receive the first transmitted symbol, and adjusts start time of the first receive window, so that the first receive window can completely receive the first transmitted symbol. In step S320, the receive end receives the first transmitted symbol by using an adjusted first receive window.

Figure 4:
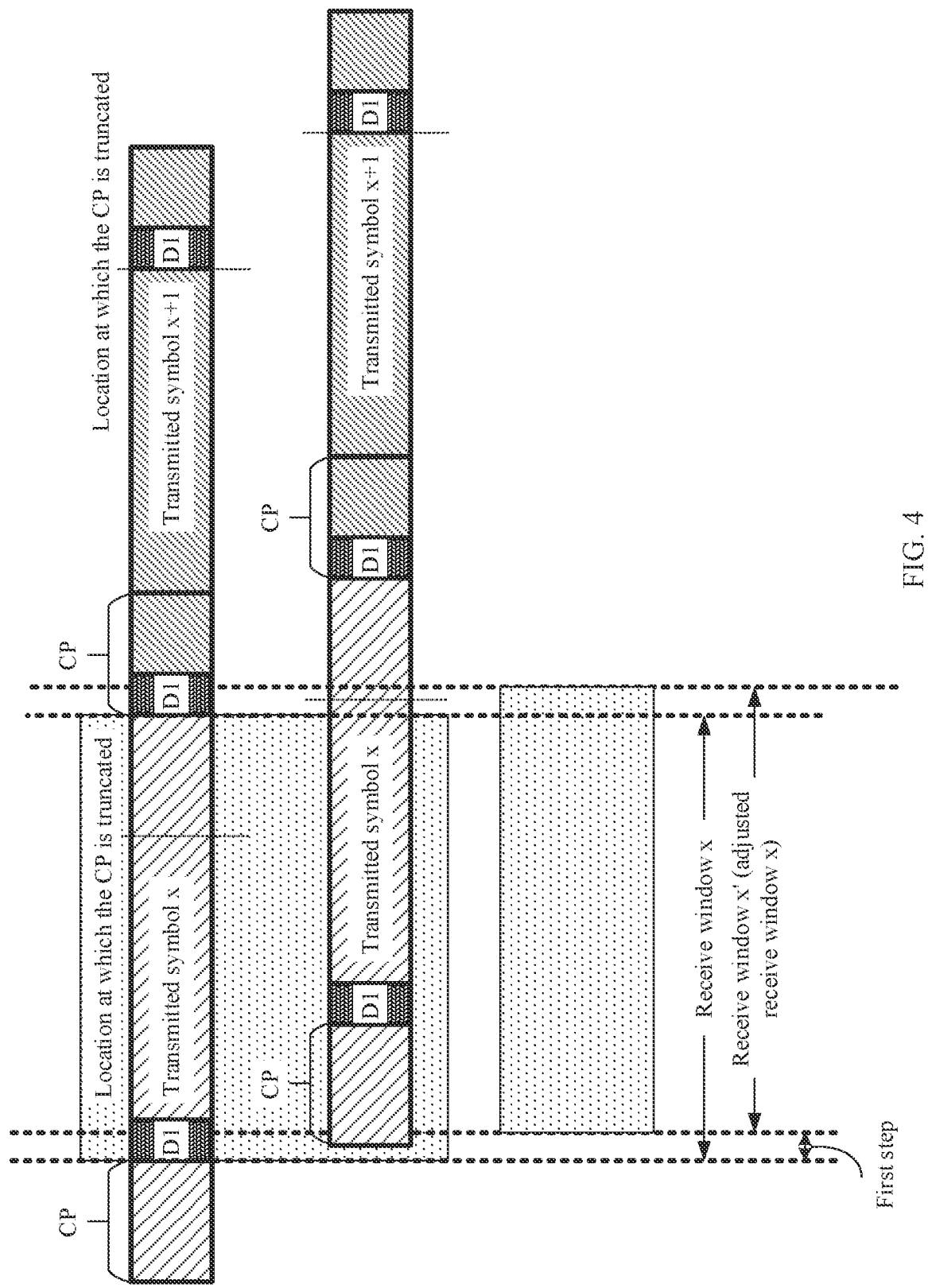
FIG. 4 is a schematic diagram of a time domain structure of a transmitted symbol according to an embodiment of this application.
Figure 6:
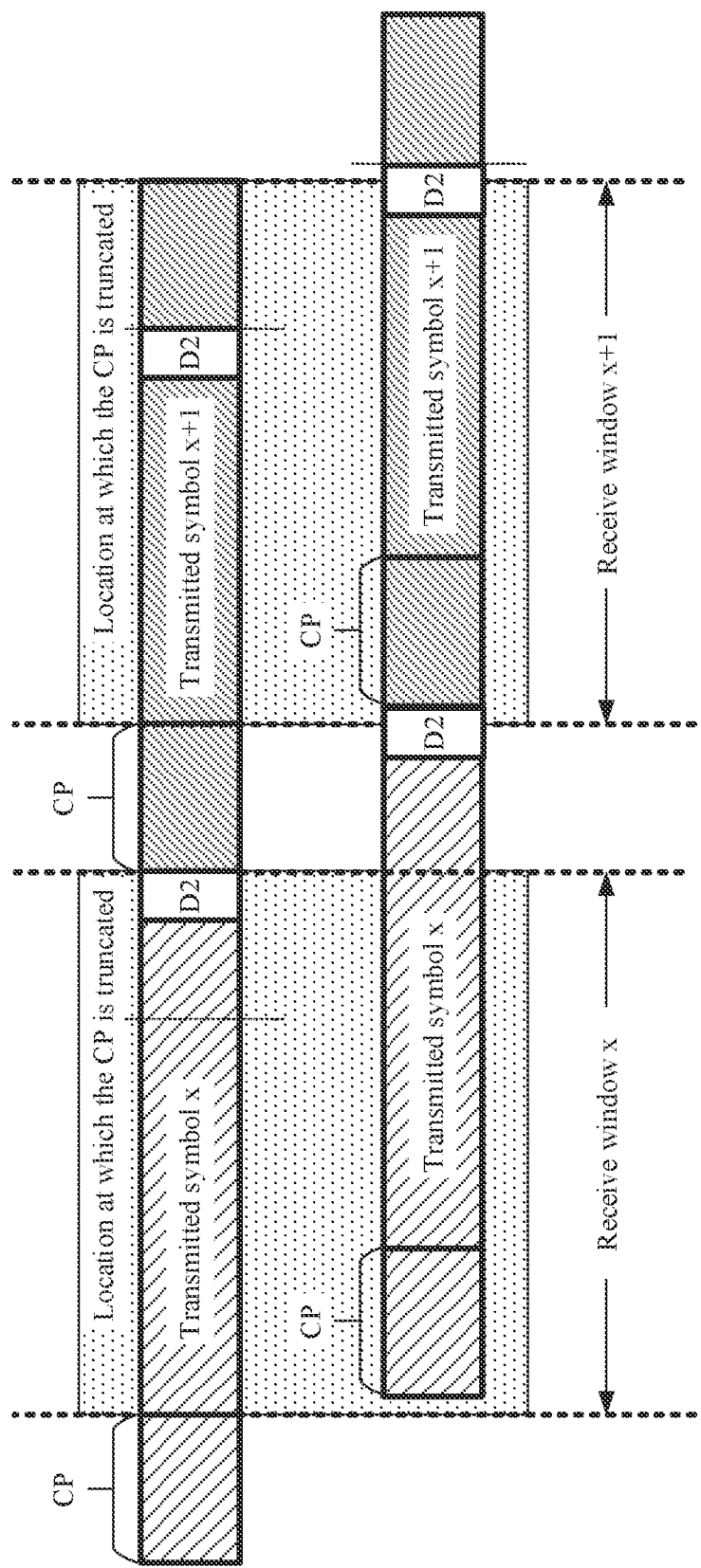
FIG. 6 is another schematic diagram of a time domain structure of a transmitted symbol according to an embodiment of this application.

For example, the first transmitted symbol and the second transmitted symbol are respectively a transmitted symbol x and a transmitted symbol x+1 in FIG. 4, and the first symbol component is a symbol component D1 in FIG. 6. The first receive window is a receive window x in FIG. 6, and the adjusted first receive window is a receive window x' in FIG. 6.

FIG. 6 is a schematic diagram of time domain structures of transmitted symbols according to an embodiment of this application. FIG. 6 shows reception of the transmitted symbols in two channel conditions. As an example but not a limitation, FIG. 6 is only a schematic diagram of a first path and a maximum delay path (which correspond to the two channel conditions).

The transmitted symbol x and the transmitted symbol x+1 shown in FIG. 6 represent two adjacent transmitted symbols, and the transmitted symbol x is before the transmitted symbol x+1. As shown in FIG. 6, the transmitted symbol x and the transmitted symbol x+1 have the same symbol component D1. A start location of the symbol component D1 in the transmitted symbol x is a start location of the transmitted symbol x, and a start location of the symbol component D1 in the transmitted symbol x+1 is a location at which a CP is truncated in the transmitted symbol x+1. The transmitted symbol x and the transmitted symbol x+1 each has a cyclic prefix (hereinafter referred to as a CP). As shown in FIG. 6, the CP of the transmitted symbol x+1 also includes the symbol component D1, and the symbol component D1 is located at the header of the CP of the transmitted symbol x+1. That the transmitted symbol x and the transmitted symbol x+1 have the same symbol component D1 indicates that the transmitted symbol x and the transmitted symbol x+1 have symbol components with a same length and same content.

The receive window x shown in FIG. 6 represents a receive window for the transmitted symbol x. The receive window x' shown in FIG. 6 represents a receive window x after start time adjustment. In the example in FIG. 6, the receive window x' is slid backward by a first step relative to the receive window x. As shown in FIG. 6, the first step is less than or equal to a length of the symbol component D1.

As shown in FIG. 6, when a maximum multipath delay exceeds a length of the CP, the transmitted symbol x cannot be completely received in the receive window x. In this embodiment, the receive end can receive the transmitted symbol x in the receive window x'. As shown in FIG. 6, because the header of the CP of the transmitted symbol x+1 includes the symbol component D1 of the transmitted symbol x, a part that is of the CP of the transmitted symbol x+1 and that enters the receive window x' also belongs to a component of the transmitted symbol x. In addition, because the first step is not greater than the length of the symbol component D1, it can be ensured that the receive window x' does not include a symbol component other than that of the transmitted symbol x. It can be learned that, when the transmitted symbol x is received in the receive window x', first, the receive window x' does not include another transmitted symbol, and second, the receive window x' can completely receive the transmitted symbol x, to reduce or overcome ISI and ICI that are caused by a multipath effect.

It can be learned from the foregoing descriptions with reference to FIG. 6 that the first transmitted symbol and the next transmitted symbol adjacent to the first transmitted symbol are enabled to have the same first symbol component, and the receive window for the first transmitted symbol is adjusted, to reduce or overcome ISI and ICI that are caused by the multipath effect.

It should be understood that, when the maximum multipath delay is large, ISI and ICI that are caused by the multipath effect can be reduced or overcome by increasing a length of the first symbol component. For example, when the maximum multipath delay is large, adjusted start time of the receive window for the first transmitted symbol may correspondingly increase by increasing the length of the first symbol component, so that the receive window for the first transmitted symbol does not include another transmitted symbol. In addition, the first transmitted symbol can be completely received in the receive window for the first transmitted symbol, to reduce or overcome ISI and ICI that are caused by the multipath effect.

It can be learned from the foregoing that, in this embodiment of this application, a guard interval between symbols can be flexibly implemented without depending on a length of a cyclic prefix. In addition, it can also be ensured that a transmitted symbol is completely received in a receive window for the transmitted symbol, to reduce or overcome ISI and ICI that are caused by the multipath effect.

It should be understood that, in this application, ISI and ICI that are caused by the multipath effect can be reduced or overcome without depending on the length of the cyclic prefix. Therefore, in this application, a length of the guard interval between the symbols can be flexibly implemented based on requirements of users in different channel conditions.

It should be noted that, in the embodiment shown in FIG. 3, a manner in which the receive end receives the first transmitted symbol is not limited in this application. The receive end may determine, based on an application requirement, a manner of receiving the first transmitted symbol.

For example, when the maximum multipath delay is less than or equal to the CP length, the receive end may receive the first transmitted symbol by using the first receive window (namely, the receive window for the first transmitted symbol). In other words, the first receive window does not need to be adjusted.

For example, when the maximum multipath delay is greater than the CP length, the receive end may receive the first transmitted symbol by using the adjusted first receive window (namely, the receive window for the first transmitted symbol). The adjusted first receive window can completely receive the first transmitted symbol.

In conclusion, the manner in which the receive end receives the first transmitted symbol may be independently determined by the receive end. This is not limited in this application.

It should further be noted that all lengths, for example, the CP length and a length of a symbol component, mentioned in this specification are time lengths. For example, a unit of the length (namely, the time length) mentioned in this specification is $T_c = 1/(4096 \cdot 480 \cdot 10^3)$ second. For another example, the time length may alternatively be represented by a quantity of time domain sampling points.

It should further be noted that FIG. 3 is merely an example but not a limitation. For example, the transmit end may generate all transmitted symbols in the transmitted symbol sequence before the sending.

In the embodiment shown in FIG. 3, the first transmitted symbol and the second transmitted symbol may represent any two adjacent transmitted symbols in the transmitted symbol sequence. In other words, the first transmitted symbol may represent a previous one of any two adjacent transmitted symbols in the transmitted symbol sequence.

For example, in the example in FIG. 6, the transmitted symbol x and the transmitted symbol x+1 may represent any two adjacent transmitted symbols in the transmitted symbol sequence.

For example, in this embodiment, the receive end may receive all the transmitted symbols other than a last transmitted symbol in the transmitted symbol sequence by using a receive window after start time adjustment.

Optionally, in the embodiment shown in FIG. 3, the first transmitted symbol represents the $1^{st}$ transmitted symbol in the transmitted symbol sequence. To be specific, the first transmitted symbol and the second transmitted symbol may represent the $1^{st}$ transmitted symbol and the $2^{nd}$ transmitted symbol in the transmitted symbol sequence.

For example, in the example in FIG. 6, the transmitted symbol x represents the $1^{st}$ transmitted symbol in the transmitted symbol sequence, and the transmitted symbol x+1 represents the $2^{nd}$ transmitted symbol in the transmitted symbol sequence.

Figure 5:
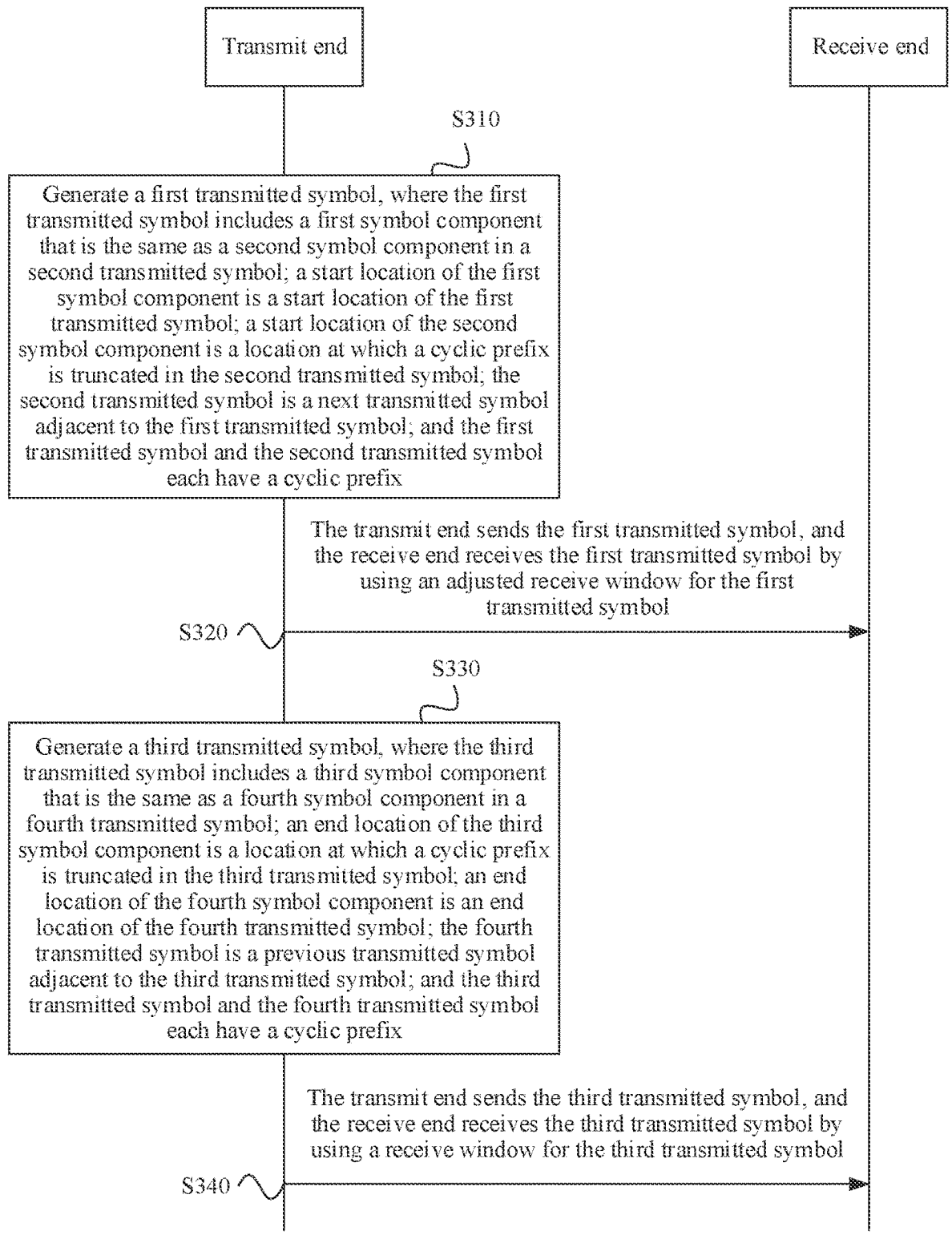
FIG. 5 is another schematic flowchart of a symbol processing method according to an embodiment of this application.

Optionally, as shown in FIG. 5, in the embodiment shown in FIG. 6, the method further includes the following steps S330 and S340.

S330: The transmit end generates a third transmitted symbol in the transmitted symbol sequence, where the third transmitted symbol and a fourth transmitted symbol have a same second symbol component; an end location of the second symbol component in the third transmitted symbol is a location at which a cyclic prefix is truncated in the third transmitted symbol; an end location of the second symbol component in the fourth transmitted symbol is an end location of the fourth transmitted symbol; the fourth transmitted symbol is a previous transmitted symbol adjacent to the third transmitted symbol; and the third transmitted symbol and the fourth transmitted symbol each has a cyclic prefix.

S340: The transmit end sends the third transmitted symbol. Correspondingly, the receive end receives the third transmitted symbol by using a receive window for the third transmitted symbol.

A sequence of performing step S330 and step S320 is not limited. For example, the transmit end may generate all the transmitted symbols in the transmitted symbol sequence before the sending.

For example, the third transmitted symbol is a transmitted symbol x+1 shown in FIG. 6, the fourth transmitted symbol is a transmitted symbol x shown in FIG. 6, the second symbol component is a symbol component D2 shown in FIG. 6, and the receive window for the third transmitted symbol is a receive window x+1 shown in FIG. 6.

FIG. 6 is a schematic diagram of time domain structures of transmitted symbols according to an embodiment of this application. FIG. 6 shows reception of the transmitted symbols in two channel conditions. As an example but not a limitation, FIG. 6 is only a schematic diagram of a first path and a maximum delay path (which correspond to the two channel conditions).

The transmitted symbol x and the transmitted symbol x+1 shown in FIG. 6 represent two adjacent transmitted symbols, and the transmitted symbol x is before the transmitted symbol x+1. As shown in FIG. 6, the transmitted symbol x and the transmitted symbol x+1 have the same symbol component D2. An end location of the symbol component D2 in the transmitted symbol x is an end location of the transmitted symbol x, and an end location of the symbol component D2 in the transmitted symbol x+1 is a location at which a CP is truncated in the transmitted symbol x+1. That the transmitted symbol x and the transmitted symbol x+1 have the same symbol component D2 indicates that the transmitted symbol x and the transmitted symbol x+1 have symbol components with a same length and same content.

As shown in FIG. 6, the transmitted symbol x and the transmitted symbol x+1 each has a cyclic prefix (hereinafter referred to as a CP). The receive window x represents a receive window for the transmitted symbol x, and the receive window x+1 represents a receive window for the transmitted symbol x+1.

As shown in FIG. 6, when a maximum multipath delay of a channel exceeds a CP length, a part of components of the transmitted symbol x enter the receive window x+1 for the transmitted symbol x+1. In the conventional technology, this causes ISI. This application can resolve this problem without changing the CP length.

As shown in FIG. 6, a part that enters the receive window x+1 and that is of the transmitted symbol x is a part of the symbol component D2, and the transmitted symbol x+1 also includes the symbol component D2. In other words, the part that enters the receive window x+1 and that is of the transmitted symbol x is also a symbol component included in the transmitted symbol x+1. Therefore, the transmitted symbol x and the transmitted symbol x+1 have the same symbol component D2. Even if the maximum multipath delay exceeds the CP length, this can prevent a symbol component that does not belong to the transmitted symbol x+1 from entering the receive window for the transmitted symbol x+1, thereby overcoming ISI.

In addition, it can be seen from FIG. 6 that, in the transmitted symbol x+1, the symbol component D2 is contiguous to a symbol component used as the CP, so that the receive window x+1 can completely receive the transmitted symbol x+1, to overcome ICI.

For example, in FIG. 6, the symbol component D2 in the transmitted symbol x and the CP of the transmitted symbol x+1 may be considered together as an equivalent guard interval between the transmitted symbol x and the transmitted symbol x+1.

It should be understood that, by using the time domain structure of the transmitted symbol shown in FIG. 6, the guard interval between the symbols can also be flexibly set without depending on the CP length, to overcome ISI and ICI that are caused by a multipath delay.

It should further be understood that, by using the time domain structure of the transmitted symbol shown in FIG. 6, for the users in the different channel conditions, multipath effects on the different users can be overcome by controlling a length of the symbol component D2.

It should further be understood that, in the time domain structure of the transmitted symbol shown in FIG. 6, the length of the symbol component D2 shared by the transmitted symbol x and the transmitted symbol x+1 does not affect a frame structure of the transmitted symbol. Therefore, the transmitted symbol shown in FIG. 6 can support (frequency division, space division, and time division) multiplexing between users having different subcarrier spacings and/or CP types.

It can be learned from the foregoing descriptions with reference to FIG. 6 that, in the embodiment shown in FIG. 5, the guard interval between the symbols can be flexibly configured without depending on the CP length, to overcome the multipath effect.

In the embodiment shown in FIG. 5, the fourth transmitted symbol and the third transmitted symbol may represent any two adjacent transmitted symbols in the transmitted symbol sequence. In other words, the third transmitted symbol may represent a next one of any two adjacent transmitted symbols in the transmitted symbol sequence.

In the embodiment shown in FIG. 5, the first transmitted symbol may represent a previous one of any two adjacent transmitted symbols in the transmitted symbol sequence, or the first transmitted symbol represents only the $1^{st}$ transmitted symbol in the transmitted symbol sequence.

When the first transmitted symbol is not the $1^{st}$ transmitted symbol in the transmitted symbol sequence, the third transmitted symbol and the first transmitted symbol may be a same transmitted symbol.

Optionally, in some of the foregoing embodiments, the first transmitted symbol and the second transmitted symbol further have the same second symbol component. An end location of the second symbol component in the first transmitted symbol is an end location of the first transmitted symbol, and an end location of the second symbol component in the second transmitted symbol is the location at which the CP is truncated in the second transmitted symbol.

Figure 7:
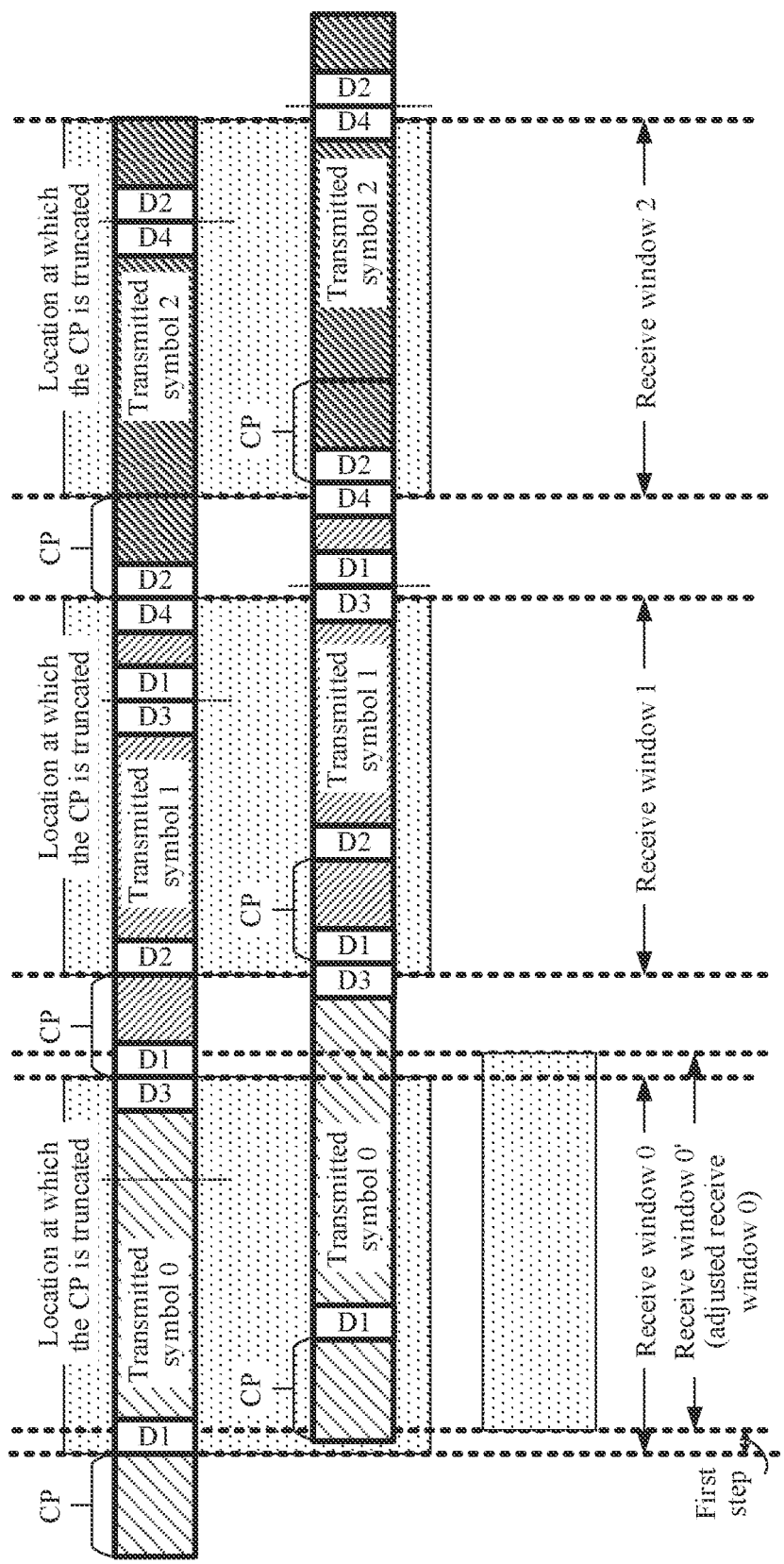
FIG. 7 is still another schematic diagram of a time domain structure of a transmitted symbol according to an embodiment of this application.

For example, the first transmitted symbol is a transmitted symbol 1 shown in FIG. 7.

FIG. 7 is a schematic diagram of time domain structures of transmitted symbols according to still another embodiment of this application. FIG. 7 is a schematic diagram of reception of the transmitted symbols in two channel conditions. As an example but not a limitation. FIG. 7 is only a schematic diagram of a first path and a maximum delay path (which correspond to the two channel conditions).

In FIG. 7, a transmitted symbol 0, the transmitted symbol 1, and a transmitted symbol 2 respectively represent the $1^{st}$, the $2^{nd}$, and the $3^{rd}$ transmitted symbols in the transmitted symbol sequence. The transmitted symbol 0, the transmitted symbol 1, and the transmitted symbol 2 each has a CP. A receive window 0 represents a receive window for the transmitted symbol 0. A receive window 0' represents an adjusted receive window 0. A step by which the receive window 0' is backward shifted relative to the receive window 0 is not greater than a symbol component D1. A receive window 1 represents a receive window for the transmitted symbol 1. A receive window 2 represents a receive window for the transmitted symbol 2.

As shown in FIG. 7, the transmitted symbol 0 and the transmitted symbol 1 have the same symbol component D1. A start location of the symbol component D1 in the transmitted symbol 0 is a start location of the transmitted symbol 0, and a start location of the symbol component D1 in the transmitted symbol 1 is a location at which the CP is truncated in the transmitted symbol 1.

Similarly, refer to the foregoing descriptions with reference to FIG. 3 or FIG. 4. Because the transmitted symbol 0 and the transmitted symbol 1 have the same symbol component D1, a multipath effect of the transmitted symbol 0 can be overcome by using the receive window 0' to receive the transmitted symbol 0.

As shown in FIG. 7, the transmitted symbol 0 and the transmitted symbol 1 further have a same symbol component D2. An end location of the symbol component D2 in the transmitted symbol 0 is an end location of the transmitted symbol 0, and an end location of the symbol component D2 in the transmitted symbol 1 is the location at which the CP is truncated in the transmitted symbol 1.

Similarly, refer to the foregoing descriptions with reference to FIG. 5 or FIG. 6. The transmitted symbol 0 and the transmitted symbol 1 have the same symbol component D2, to overcome a multipath effect of the transmitted symbol 1.

As shown in FIG. 7, the transmitted symbol 1 and the transmitted symbol 2 have a same symbol component D3. An end location of the symbol component D3 in the transmitted symbol 1 is an end location of the transmitted symbol 1, and an end location of the symbol component D3 in the transmitted symbol 2 is a location at which a CP is truncated in the transmitted symbol 2.

Similarly, refer to the foregoing descriptions with reference to FIG. 5 or FIG. 6. The transmitted symbol 1 and the transmitted symbol 2 have the same symbol component D3, to overcome a multipath effect of the transmitted symbol 2.

Optionally, in the embodiment shown in FIG. 7, a transmitted symbol other than the $1^{st}$ transmitted symbol and a next transmitted symbol adjacent to the transmitted symbol may also have a same symbol component similar to the symbol component D1.

As shown in FIG. 7, the transmitted symbol 1 and the transmitted symbol 2 further have a same symbol component D4. A start location of the symbol component D4 in the transmitted symbol 1 is a start location of the transmitted symbol 1, and a start location of the symbol component D4 in the transmitted symbol 2 is the location at which the CP is truncated in the transmitted symbol 2.

In this embodiment, the receive end may alternatively receive the transmitted symbol 1 by using an adjusted receive window (which is denoted as a receive window 1') for the transmitted symbol 1. For example, relative to the receive window 1, the receive window 1' is slid backward by a step that is not greater than a length of the symbol component D4.

Similarly, refer to the foregoing descriptions with reference to FIG. 3 or FIG. 4. Because the transmitted symbol 1 and the transmitted symbol 2 have the same symbol component D4, the multipath effect of the transmitted symbol 1 can be overcome by using the receive window 1' to receive the transmitted symbol 1.

It should be understood that FIG. 7 is merely an example but not a limitation. During actual application, the transmitted symbol sequence may include a larger quantity of transmitted symbols. Any two adjacent transmitted symbols may have time domain structures similar to those of the transmitted symbol 0 and the transmitted symbol 1 or time domain structures similar to those of the transmitted symbol 1 and the transmitted symbol 2.

It should be understood that the first transmitted symbol and the second transmitted symbol have the same symbol component D1 and the same symbol component D2, which reduces impact of a tailing effect of a filter on extension of the guard interval between the symbols to some extent.

Optionally, in an embodiment, any two adjacent transmitted symbols in the transmitted symbol sequence may be respectively the first transmitted symbol and the second transmitted symbol in the foregoing embodiment. In this example, the last transmitted symbol and a previous transmitted symbol adjacent to the last transmitted symbol in the transmitted symbol sequence may be respectively the third transmitted symbol and the fourth transmitted symbol in the foregoing embodiment.

For example, time domain structures of any two adjacent transmitted symbols in the transmitted symbol sequence are shown as those of the transmitted symbol x+1 and the transmitted symbol x in FIG. 6. Time domain structures of the last transmitted symbol and the previous transmitted symbol adjacent to the last transmitted symbol in the transmitted symbol sequence may be shown as those of the transmitted symbol x+1 and the transmitted symbol x in FIG. 6.

It should be understood that, in this embodiment, for each transmitted symbol in the transmitted symbol sequence, ISI and ICI that are caused by the multipath effect can be reduced or overcome.

Optionally, in another embodiment, any two adjacent transmitted symbols in the transmitted symbol sequence may be respectively the fourth transmitted symbol and the third transmitted symbol in the foregoing embodiment. In this example, the $1^{st}$ transmitted symbol and the $2^{nd}$ transmitted symbol in the transmitted symbol sequence may be respectively the first transmitted symbol and the second transmitted symbol in the foregoing embodiment.

For example, time domain structures of any two adjacent transmitted symbols in the transmitted symbol sequence are shown as those of the transmitted symbol x and the transmitted symbol x+1 in FIG. 4. Time domain structures of the $1^{st}$ transmitted symbol and the $2^{nd}$ transmitted symbol in the transmitted symbol sequence may be shown as those of the transmitted symbol x and the transmitted symbol x+1 in FIG. 4.

It should be understood that, in this embodiment, for each transmitted symbol in the transmitted symbol sequence, ISI and ICI that are caused by the multipath effect can be reduced or overcome.

Based on the foregoing descriptions, in this application, two adjacent transmitted symbols are enabled to have a same symbol component, to flexibly set the guard interval between the symbols without depending on the CP length. For example, in this application, ISI and ICI that are caused by the multipath effect can be reduced or overcome for the users in the different channel conditions when unnecessary bandwidth overheads are avoided.

Optionally. CP lengths of the transmitted symbols in the transmitted symbol sequence may be different, may be the same, or may be incompletely the same.

The transmitted symbol sequence in this embodiment of this application may be a transmitted symbol sequence including a plurality of transmitted symbols.

Optionally, the transmitted symbol sequence in this embodiment of this application may alternatively be a transmitted symbol sequence including a plurality of transmitted subsymbols obtained through processing based on a single transmitted symbol.

In some communication scenarios, an amount of data that needs to be transmitted is small. For example, the amount of the data that needs to be transmitted may be only one or several bits. In this case, service transmission can be completed by using one transmitted symbol. This scenario is referred to as short-packet transmission or short-time transmission (where the following uses the short-packet transmission as an example for description).

The short-packet transmission may exist in uplink transmission. For example, in an uplink control information (UCI) reporting scenario, or in a data scheduling request scenario, an amount of data that needs to be sent by a terminal device may be only one or several bits. In this case, the terminal device can complete service transmission by sending one transmitted symbol.

The short-packet transmission may also exist in downlink transmission. For example, in a transmission scenario based on a physical downlink control channel (PDCCH), an amount of data that needs to be sent by a network device may be only one or several bits. In this case, the network device can complete downlink signal transmission by sending one transmitted symbol.

In the short-packet transmission, because only a single transmitted symbol is transmitted, to implement independent transmission and demodulation of the single transmitted symbol, a reference signal, for example, a demodulation reference signal (DMRS), usually needs to be inserted into the single transmitted symbol. When the reference signal is inserted into the single transmitted symbol, a CP is usually added to the reference signal. It may be understood that the single transmitted symbol is split into a plurality of transmitted subsymbols.

Figure 8:
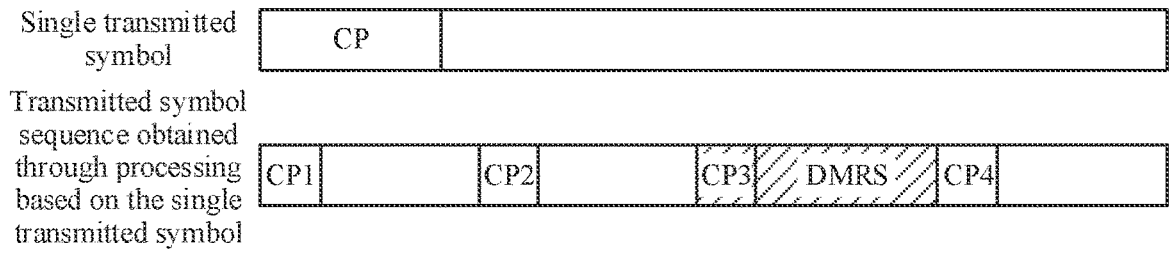
FIG. 8 is a schematic diagram of a transmitted symbol sequence obtained through processing based on a single transmitted symbol.

FIG. 8 is a schematic diagram in which a single transmitted symbol is split into four transmitted subsymbols. In FIG. 8, for example, a reference signal is a DMRS.

As shown in FIG. 8, the single transmitted symbol is processed into the four transmitted subsymbols, and the $3^{rd}$ transmitted subsymbol is a DMRS. The single transmitted symbol may be considered as a transmitted symbol sequence including the four transmitted subsymbols. A CP 1 represents a CP of the $1^{st}$ transmitted subsymbol in the transmitted symbol sequence. A CP 2 represents a CP of the $2^{nd}$ transmitted subsymbol in the transmitted symbol sequence. A CP 3 represents a CP of the $3^{rd}$ transmitted subsymbol in the transmitted symbol sequence. A CP 4 represents a CP of the $4^{th}$ transmitted subsymbol in the transmitted symbol sequence.

It can be learned from FIG. 8 that a CP length of the transmitted subsymbol is definitely shorter than that of the single transmitted symbol. Therefore, the transmitted symbol sequence including the four transmitted subsymbols is more likely to be affected by a multipath effect.

This application may be applied to the transmitted symbol sequence including a plurality of transmitted subsymbols shown in FIG. 8.

For ease of understanding and description, in the following, a transmitted symbol sequence including a plurality of transmitted subsymbols obtained through processing based on a single transmitted symbol is referred to as a second-type transmitted symbol sequence.

For example, the first transmitted symbol in the foregoing embodiment may be the $1^{st}$ transmitted subsymbol in the second-type transmitted symbol sequence, or the first transmitted symbol in the foregoing embodiment may represent a previous one of any two adjacent transmitted subsymbols in the second-type transmitted symbol sequence.

For another example, the third transmitted symbol in the foregoing embodiment may represent a next one of any two adjacent transmitted subsymbols in the second-type transmitted symbol sequence.

Optionally, in the transmitted symbol sequence including the plurality of transmitted subsymbols obtained through processing based on the single transmitted symbol, CP lengths of the transmitted subsymbols may be different, may be the same, or may be incompletely the same.

This application further provides a symbol processing method. The method includes the following steps:

Step 1: A transmit end generates a first transmitted subsymbol in a transmitted symbol sequence. The transmitted symbol sequence is a transmitted symbol sequence including a plurality of transmitted subsymbols obtained through processing based on a single transmitted symbol.

Step 2: The transmit end sends the first transmitted subsymbol. Correspondingly, a receive end receives the first transmitted subsymbol based on a receive window for the first transmitted subsymbol.

Optionally, the first transmitted subsymbol and a second transmitted subsymbol have a same first symbol component. A start location of the first symbol component in the first transmitted subsymbol is a start location of the first transmitted symbol. A start location of the first symbol component in the second transmitted subsymbol is a location at which a cyclic prefix is truncated in the second transmitted symbol. The second transmitted subsymbol is a next transmitted symbol adjacent to the first transmitted subsymbol. The first transmitted subsymbol and the second transmitted subsymbol each has a cyclic prefix.

For example, a time domain structure of the first transmitted subsymbol is the time domain structure of the transmitted symbol x shown in FIG. 4.

In this embodiment, the first transmitted subsymbol may represent the $1^{st}$ transmitted subsymbol in a second-type transmitted symbol sequence. Alternatively, the first transmitted subsymbol may represent a previous one of two adjacent transmitted subsymbols in a second-type transmitted symbol sequence.

In this embodiment, the receive end may receive the first transmitted subsymbol by using an adjusted receive window for the first transmitted subsymbol.

Optionally, the first transmitted subsymbol and a third transmitted subsymbol have a same second symbol component. An end location of the second symbol component in the first transmitted subsymbol is a location at which a cyclic prefix is truncated in the first transmitted subsymbol. An end location of the second symbol component in the third transmitted subsymbol is an end location of the third transmitted subsymbol. The third transmitted subsymbol is a previous transmitted symbol adjacent to the first transmitted subsymbol. The first transmitted subsymbol and the third transmitted subsymbol each has a cyclic prefix.

For example, the time domain structure of the first transmitted subsymbol is the time domain structure of the transmitted symbol x+1 shown in FIG. 6.

In this embodiment, the first transmitted subsymbol may represent a next one of two adjacent transmitted subsymbols in the second-type transmitted symbol sequence.

Optionally, the first transmitted subsymbol and the second transmitted subsymbol have the same first symbol component, and the first transmitted subsymbol and the third transmitted subsymbol have the same second symbol component.

For example, the time domain structure of the first transmitted subsymbol is the time domain structure of the transmitted symbol 1 shown in FIG. 7.

In this embodiment, the first transmitted subsymbol may represent any transmitted subsymbol in the second-type transmitted symbol sequence other than the $1^{st}$ transmitted subsymbol and the last transmitted subsymbol.

In this embodiment, the receive end may receive the first transmitted subsymbol by using the adjusted receive window for the first transmitted subsymbol.

For the second-type of transmitted symbol sequence, this application further provides a symbol processing method. In this method, guard interval extension processing may be performed only on a transmitted subsymbol whose CP is less than a maximum multipath delay.

The method includes: determining that a CP of a first transmitted subsymbol in the second-type transmitted symbol sequence is less than the maximum multipath delay, and generating the first transmitted subsymbol in a guard interval extension processing manner. The guard interval extension processing does not change a CP length of the first transmitted subsymbol, and can equivalently extend a guard interval of the first transmitted subsymbol.

When the first transmitted subsymbol is the $1^{st}$ transmitted subsymbol, in the CP extension manner, the first transmitted subsymbol and a second transmitted subsymbol are enabled to have a same first symbol component. A start location of the first symbol component in the first transmitted subsymbol is a start location of the first transmitted symbol. A start location of the first symbol component in the second transmitted subsymbol is a location at which a cyclic prefix is truncated in the second transmitted symbol. The second transmitted subsymbol is a next transmitted symbol adjacent to the first transmitted subsymbol. The first transmitted subsymbol and the second transmitted subsymbol each has a cyclic prefix.

When the first transmitted subsymbol is not the $1^{st}$ transmitted subsymbol, in the CP extension manner, the first transmitted subsymbol and a second transmitted subsymbol have a same first symbol component, where a start location of the first symbol component in the first transmitted subsymbol is a start location of the first transmitted symbol, a start location of the first symbol component in the second transmitted subsymbol is a location at which a cyclic prefix is truncated in the second transmitted symbol, the second transmitted subsymbol is a next transmitted symbol adjacent to the first transmitted subsymbol, and the first transmitted subsymbol and the second transmitted subsymbol each has a cyclic prefix; or the first transmitted subsymbol and a third transmitted subsymbol have a same second symbol component, where an end location of the second symbol component in the first transmitted subsymbol is a location at which a cyclic prefix is truncated in the first transmitted subsymbol, an end location of the second symbol component in the third transmitted subsymbol is an end location of the third transmitted subsymbol, the third transmitted subsymbol is a previous transmitted symbol adjacent to the first transmitted subsymbol, and the first transmitted subsymbol and the third transmitted subsymbol each has a cyclic prefix.

Optionally, in this embodiment, a transmitted subsymbol whose CP is not less than the maximum multipath delay may be generated according to a conventional method.

For example, in the example shown in FIG. 8, if the CPs of the four transmitted subsymbols are all not less than the maximum multipath delay, the four transmitted subsymbols are generated according to the conventional method. If the CP 2 is less than the maximum multipath delay, the $2^{nd}$ transmitted subsymbol is generated in the foregoing guard interval extension processing manner, and the other three transmitted subsymbols are generated according to the conventional method.

The following describes a method for generating a transmitted symbol. For ease of understanding but not limitation, the following first describes content related to a process of generating the transmitted symbol.

Figure 9:
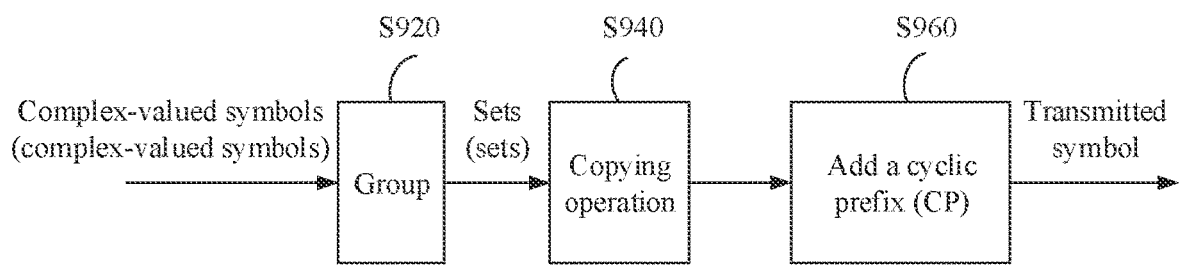
FIG. 9, FIG. 10, and FIG. 11 are basic flowcharts of generating a transmitted symbol according to an embodiment of this application.

FIG. 9 is a schematic diagram of a basic procedure of generating a transmitted symbol. As shown in FIG. 9, the procedure includes the following steps S920, S940, and S960.

S920: Group a plurality of complex-valued symbols to obtain a plurality of sets, where each set corresponds to one transmitted symbol.

In other words, the plurality of complex-valued symbols are divided into the plurality of sets, and each set corresponds to one transmitted symbol.

The plurality of complex-valued symbols may include a modulated symbol obtained by modulating a coded bit stream.

A modulation scheme for modulating the coded bit stream may include pi/2-binary phase shift keying (BPSK), quadrature phase shift keying (QPSK), 16-quadrature amplitude modulation (QAM), 64-QAM, 256-QAM, phase shift keying (PSK), amplitude phase shift keying (APSK), non-uniform QAM, or the like.

Alternatively, the plurality of complex-valued symbols may further include a reference signal sampling point. For example, the reference signal sampling point may include a phase tracking reference signal (PTRS) sampling point.

That each set corresponds to one transmitted symbol means that each finally generated transmitted symbol is generated based on a corresponding set.

S940: Perform a complex-valued symbol copying operation on the plurality of sets obtained in step S920.

S960: Obtain, based on a set that is obtained in step S940 through the copying operation, a transmitted symbol by adding a CP (or add a CP based on a set that is obtained in step S940 through the copying operation, and then perform another operation to obtain the transmitted symbol, where the another operation described herein includes but is not limited to fast Fourier transformation, carrier mapping, sampling, filtering, or the like).

For two sets corresponding to two transmitted symbols that are continuous in time domain, the copying operation in step 940 enables the two sets to have a part of same complex-valued symbols.

The following describes the copying operation in step S940.

For ease of distinguishing but not limitation, the following agreement on names of signals is made in this specification: Signals to be grouped (or divided) into a set are referred to as complex-valued symbols. A signal obtained by grouping (or dividing) the complex-valued symbols is referred to as a set. A set including a part of complex-valued symbols in the set is referred to as a subset. A signal sent by a transmit end is referred to as a transmitted symbol.

It should be understood that these names are merely for ease of understanding and distinguishing but not limitation. For example, in a future technology evolution process, signals obtained at different stages of a symbol generation procedure may have other names.

The transmitted symbol in this embodiment of this application may be a symbol of a single-carrier waveform.

For example, the transmitted symbol is a DFT-s-OFDM symbol or an SC-QAM symbol. The DFT-s-OFDM symbol represents a single-carrier symbol whose waveform is a DFT-s-OFDM waveform. The SC-QAM symbol represents a single-carrier symbol whose waveform is an SC-QAM waveform.

In the following, a wireless communication system to which the DFT-s-OFDM waveform is applicable in this application is denoted as an application scenario 1, and a wireless communication system to which the SC-QAM waveform is applicable in this application is denoted as an application scenario 2.

Figure 10:
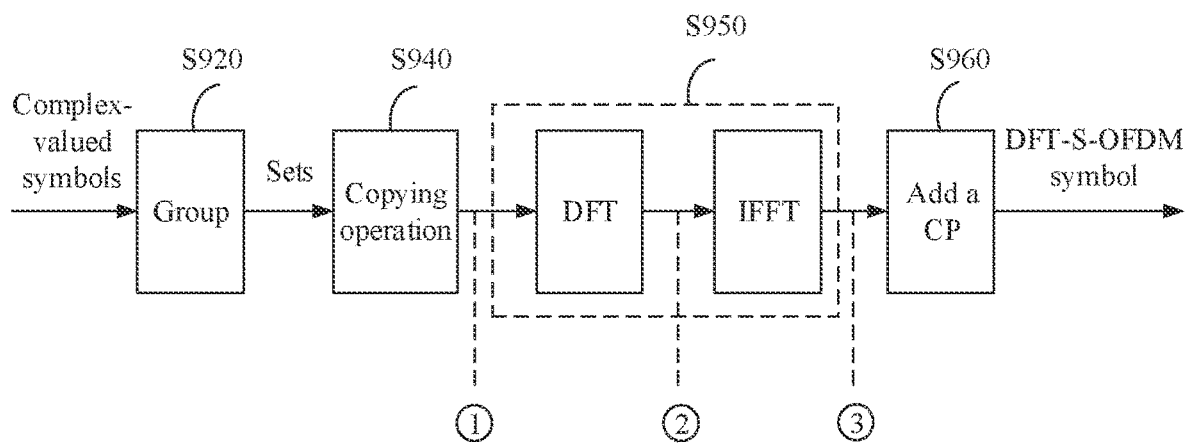

Optionally, an application scenario of this application is the application scenario 1. To be specific, the transmitted symbol is a DFT-s-OFDM symbol. As shown in FIG. 10, step S950 may further be included between step S940 and step S960.

In step S950, a discrete Fourier transformation (DFT) operation and an inverse fast Fourier transformation (IFFT) operation are included.

For example, in step S950, a transmit end performs M-point DFT on the set obtained through the copying operation, then maps M-point frequency domain elements to M consecutive subcarriers (not shown in FIG. 10), and performs IFFT on a frequency domain signal after the subcarrier mapping. IFFT is performed after the subcarrier mapping. The DFT may also be referred to as frequency domain precoding.

In the embodiment shown in FIG. 10, step S960 includes: adding a CP to a signal obtained through the IFFT, to obtain a DFT-s-OFDM symbol.

Optionally, step S950 further includes a frequency domain spectrum shaping (FDSS) operation.

For example, in step S950, the transmit end performs M-point DFT on the set obtained through the copying operation, performs cyclic extension and frequency domain filtering (namely, the FDSS operation) on M-point frequency domain elements obtained through the DFT, then maps frequency domain elements obtained through the FDSS operation to M1 (M1≥M) consecutive subcarriers, and performs IFFT on a frequency domain signal after the subcarrier mapping.

It should be understood that, in the application scenario 1, the copying operation is performed on the set before the DFT.

Figure 11:
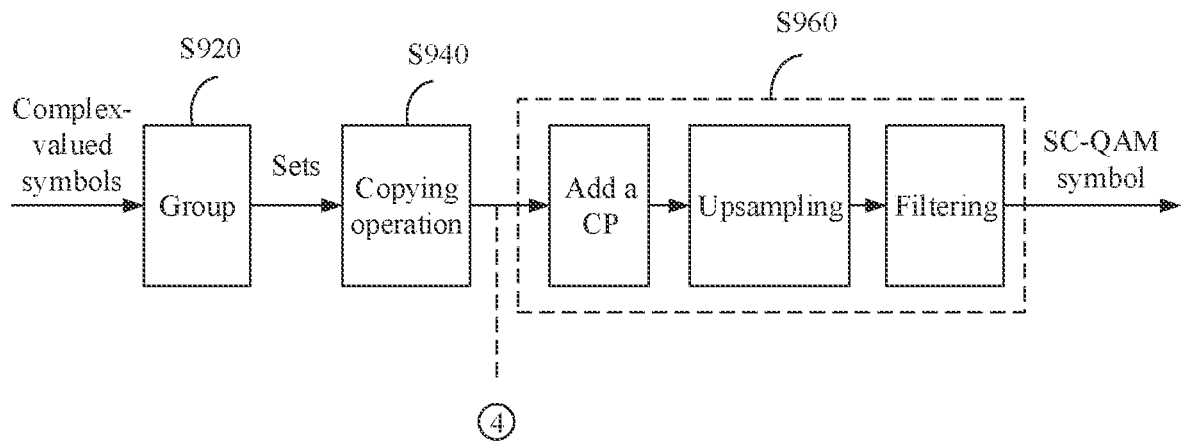

Optionally, an application scenario of this application is the application scenario 2. To be specific, the transmitted symbol is an SC-QAM symbol. As shown in FIG. 11, in step S960, not only is an operation of adding a CP included, but also upsampling and filtering are included.

For example, in step S960, a transmit end adds the CP to the set obtained through the copying operation, to obtain a signal to which the CP is added, and then performs upsampling and filtering on the signal to which the CP is added, to finally obtain the SC-QAM symbol.

It should be understood that, in the application scenario 2, the copying operation is performed on the set before the CP is added.

Figure 12:
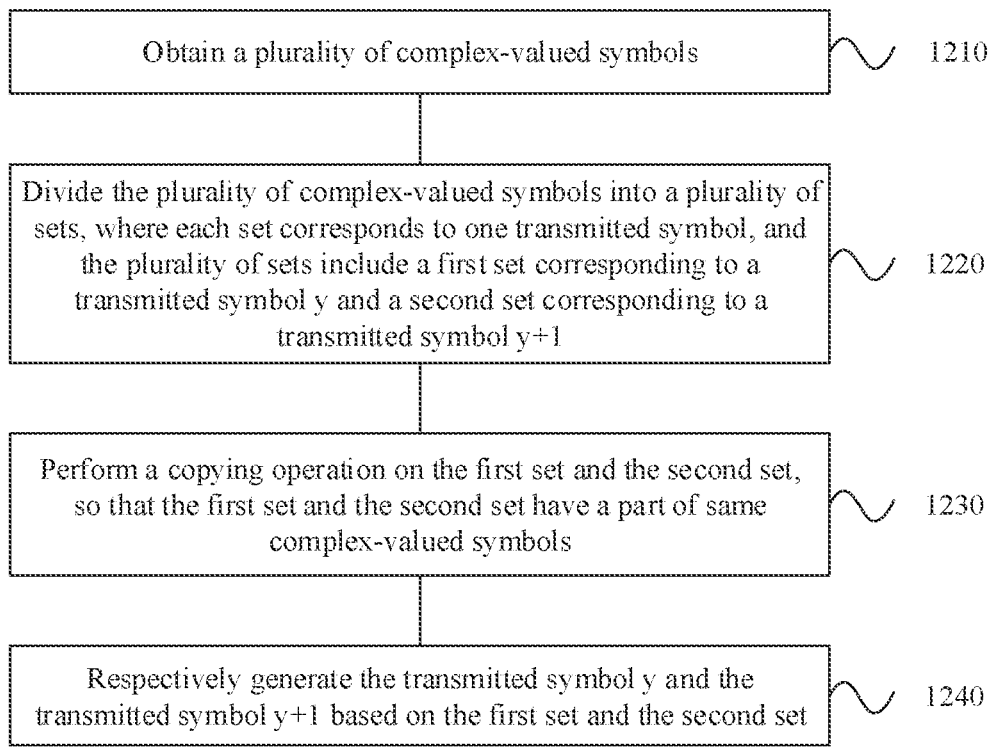
FIG. 12 is a schematic flowchart of a method for generating a transmitted symbol according to an embodiment of this application.

FIG. 12 is a schematic flowchart of a method for generating a transmitted symbol according to an embodiment of this application. In FIG. 12, adjacent transmitted symbols y and y+1 are used as an example for description. The transmitted symbol y is located before the transmitted symbol y+1.

As shown in FIG. 12, a procedure of generating the transmitted symbol y and the transmitted symbol y+1 includes the following steps S1210 to S1240.

S1210: Obtain a plurality of complex-valued symbols.

The plurality of complex-valued symbols may include a modulated symbol obtained by modulating a coded bit stream.

Optionally, the plurality of complex-valued symbols may further include a reference signal sampling point. For example, the reference signal sampling point may include a PTRS sampling point.

S1220: Divide the plurality of complex-valued symbols into a plurality of sets, or in other words, group a plurality of complex-valued symbols to obtain a plurality of sets. Each set may include several complex-valued symbols. For example, each set may be considered as one multidimensional time domain vector, and the complex-valued symbols in the set may be considered as elements in the time domain vector.

Each set corresponds to one transmitted symbol. For example, each set corresponds to one DFT-s-OFDM symbol or SC-QAM symbol.

The plurality of sets include a first set corresponding to the transmitted symbol y and a second set corresponding to the transmitted symbol y+1.

For example, step S1220 may separately correspond to step S920 shown in FIG. 9, FIG. 10, and FIG. 11.

S1230: Perform a copying operation on the first set and the second set, so that the first set and the second set have a part of same complex-valued symbols.

For example, step S1230 may separately correspond to step S940 shown in FIG. 9, FIG. 10, and FIG. 11.

It should be understood that, in the application scenario 1, step S1230 is performed before DFT, and in the application scenario 2, step S1230 is performed before a CP is added.

S1240: Generate the transmitted symbol y based on the first set, and generate the transmitted symbol y+1 based on the second set.

It should be understood that because the first set and the second set have the part of same complex-valued symbols, the transmitted symbol y and the transmitted symbol y+1 may be enabled to have the time domain structures of any two adjacent transmitted symbols shown in FIG. 4, FIG. 6, or FIG. 7.

It should be understood that the symbol generation method provided in the embodiment shown in FIG. 12 may be applied to any transmitted symbol in a signal stream transmitted by a transmit end.

For example, the transmitted symbol y and the transmitted symbol y+1 may respectively correspond to the first transmitted symbol and the second transmitted symbol in the foregoing embodiment.

For another example, the transmitted symbol y and the transmitted symbol y+1 may respectively correspond to the fourth transmitted symbol and the third transmitted symbol in the foregoing embodiment.

Based on the different time domain structures of the transmitted symbol y and the transmitted symbol y+1, step S1230 may be implemented in a plurality of different manners. The following provides description.

For ease of understanding and description of the copying operation on the set, the following first describes an association between the set and the transmitted symbol.

For ease of understanding and description but not limitation, in the following, three reference points are defined for the transmitted symbol: A first reference point, a second reference point, and a third reference point. The first reference point represents an end location of the transmitted symbol, the second reference point represents a location at which a CP is truncated in the transmitted symbol, and the third reference point represents a start location of the transmitted symbol. The start location of the transmitted symbol is the start location of the transmitted symbol, and is not a start location of the CP of the transmitted symbol. Alternatively, it may be understood from another perspective that the start location of the transmitted symbol is an end location of the CP of the transmitted symbol.

All locations mentioned in this specification refer to time domain locations.

The following separately uses the application scenario 1 and the application scenario 2 as examples for description.

(1) Application scenario 1 in which the transmitted symbol is a DFT-s-OFDM symbol. In the application scenario 1, a symbol processing procedure is shown in FIG. 10.

Assuming (denoted as an assumption 1) that the transmit end performs DFT on M points, a dimension of a time domain vector on which DFT needs to be performed should be M. The time domain vector may be denoted as:

$$x_l = [x_l(0), x_l(1), \ldots, x_l(M-1)]^T$$

$x_l$ represents the time domain vector.

The time domain vector $x_l$ includes M elements, and time domain indexes of the $1^{st}$ element to a last element are respectively 0, 1, . . . . . , and M−1.

Assuming (denoted as an assumption 2) that the transmit end performs DFT on M (which is consistent with that in the assumption 1) points, the transmit end performs IFFT in a size N, and a quantity of sampling points of the CP is P. In this case, a quantity of points that can be equivalent to a length occupied by the CP before DFT is K=P/N·M.

If P cannot be exactly divided by N, a calculation result of K is not an integer. In this case, the calculation result of K needs to be rounded, that is, K=⌊(P/N)·M⌋. ⌊(P/N)·M⌋ represents rounding (P/N)·M down. It should be understood that a rounding manner herein may alternatively be rounding up, rounding off, or the like.

It should be understood that the quantity P of sampling points of the CP may be obtained based on the CP length.

Based on the foregoing assumption, a time domain index of a first reference point of the DFT-s-OFDM symbol in the time domain vector $x_l$ is M−1. A time domain index of a second reference point of the DFT-s-OFDM symbol in the time domain vector $x_l$ is M−K−1. A time domain index of a third reference point of the DFT-s-OFDM symbol in the time domain vector $x_l$ is 0.

(2) Application scenario 2 in which the transmitted symbol is an SC-QAM symbol. As shown in FIG. 11, in a process of generating the SC-QAM symbol, neither DFT nor IFFT is included before the CP is added, and upsampling and filtering are performed after the CP is added. Therefore, a quantity that is of points in a time domain vector and that is equivalent to a CP length may be directly obtained based on the CP length. Therefore, a transmit end may directly obtain an equivalent CP length value K1. The equivalent CP length value K1 may be obtained based on the CP length.

It is assumed that a time domain vector to which no CP is added is the M-dimensional time domain vector $x_l$ described in the application scenario 1, and the equivalent CP length value is K1. In this case, a time domain index of a first reference point of the SC-QAM symbol in the time domain vector $x_l$ is M−1. A time domain index of a second reference point of the SC-QAM symbol in the time domain vector $x_l$ is M−K1−1. A time domain index of a third reference point of the SC-QAM symbol in the time domain vector $x_l$ is 0.

As described above, a set may be considered as a multi-dimensional time domain vector. The time domain vector $x_l$ in the foregoing example may represent a time domain vector corresponding to a set. An element in the time domain vector $x_l$ corresponds to a complex-valued symbol in the set. A time domain index of the element in the time domain vector $x_l$ corresponds to a location of the complex-valued symbol in the set.

The foregoing example indicates that there is a correspondence between the time domain index of the element in the time domain vector $x_l$ and a time domain location (for example, a first reference point, a second reference point, or a third reference point) in a transmitted symbol corresponding to the time domain vector $x_l$. Therefore, there is also a correspondence between the location of the complex-valued symbol in the set and a location of the transmitted symbol corresponding to the set.

Based on the different time domain structures of the transmitted symbol y and the transmitted symbol y+1, in step S1230, copying operations in a plurality of different manners may be performed on the first set and the second set.

A First Copying Operation:

When the transmitted symbol y and the transmitted symbol y+1 respectively correspond to the first transmitted symbol and the second transmitted symbol in the foregoing embodiment, for example, the transmitted symbol y and the transmitted symbol y+1 are respectively the transmitted symbol x and the transmitted symbol x+1 in FIG. 4, the first copying operation may be performed on the first set and the second set in step S1230.

The first copying operation enables the first set and the second set to each have a first complex-valued symbol. A start location of the first complex-valued symbol in the first set corresponds to a third reference point of the transmitted symbol y. A start location of the first complex-valued symbol in the second set corresponds to a second reference point of the transmitted symbol y+1. For example, the first complex-valued symbol may include a plurality of complex-valued symbols.

A Second Copying Operation:

When the transmitted symbol y and the transmitted symbol y+1 respectively correspond to the fourth transmitted symbol and the third transmitted symbol in the foregoing embodiment, for example, the transmitted symbol y and the transmitted symbol y+1 are respectively the transmitted symbol x and the transmitted symbol x+1 in FIG. 6, the second copying operation may be performed on the first set and the second set in step S1230.

The second copying operation enables the first set and the second set to each have a second complex-valued symbol. An end location of the second complex-valued symbol in the first set corresponds to a first reference point of the transmitted symbol y. An end location of the second complex-valued symbol in the second set corresponds to a second reference point of the transmitted symbol y+1. For example, the second complex-valued symbol may include a plurality of complex-valued symbols.

For example, a time domain vector corresponding to a first subset including the second complex-valued symbol in the first set is the following subvector $x_l[1]$ in the time domain vector $x_l$ corresponding to the first set:

$$x_l[1] = [x_l(M - M_l^1), x_l(M - M_l^1 + 1), \ldots, x_l(M - 1)]^T$$

A time domain vector corresponding to a second subset including the second complex-valued symbol in the second set is the following subvector $x_{l+1}[2]$ in a time domain vector $x_{l+1}$ corresponding to the second set:

$$x_{l+1}[2] = \\ [x_{l+1}(M - M_l^1 - K), x_{l+1}(M - M_l^1 - K + 1), \ldots, x_{l+1}(M - K - 1)]^T$$

M represents a dimension of the time domain vector $x_l$ corresponding to the first set and the time domain vector $x_{l+1}$ corresponding to the second set. $M_l^1$ represents a length of a subset including a same complex-valued symbol between the first set and the second set. M−K−1 represents a time domain index of a second reference point of the second transmitted symbol in the time domain vector corresponding to the second set. A value of K is related to a length of the cyclic prefix (CP). For example, the value of K is determined based on the CP length.

It should be understood that, in the application scenario 1, K in this example is obtained through calculation according to K=P/N·M (refer to the foregoing description). In the application scenario 2. K in this example is equal to the equivalent CP length value K1.

It should be understood that, in this example, the subvector $x_l[1]$ in the time domain vector $x_l$ corresponding to the first set is the same as an element included in the first subset in the first set, and the subvector $x_{l+1}[2]$ in the time domain vector $x_{l+1}$ corresponding to the second set is the same as an element included in the second subset in the second set.

A Third Copying Operation:

When the transmitted symbol y and the transmitted symbol y+1 respectively not only correspond to the first transmitted symbol and the second transmitted symbol in the foregoing embodiment, but also correspond to the fourth transmitted symbol and the third transmitted symbol in the foregoing embodiment, for example, the transmitted symbol y and the transmitted symbol y+1 are respectively the transmitted symbol 1 and the transmitted symbol 2 in FIG. 7, the third copying operation may be performed on the first set and the second set in step S1250.

The third copying operation includes the first copying operation and the second copying operation. To be specific, the third copying operation enables the first set and the second set to each have a first complex-valued symbol and a second complex-valued symbol.

For descriptions of the first copying operation, the second copying operation, the first complex-valued symbol, and the second complex-valued symbol, refer to the foregoing descriptions. For brevity, details are not described herein again.

Optionally, in this embodiment, the first copying operation and the second copying operation are separately performed.

Optionally, in this embodiment, the first copying operation and the second copying operation are performed in combination, that is, the first copying operation and the second copying operation are completed by performing one copying operation.

The first copying operation performed on the first set and the second set may also be understood as mapping the first complex-valued symbol to the first set and the second set. The second copying operation performed on the first set and the second set may also be understood as mapping the second complex-valued symbol to the first set and the second set.

The second copying operation performed on the first set and the second set in step S1230 is used as an example. Optionally, in step S1230, the second complex-valued symbol in the first set is copied to the second set.

For example, a time domain vector corresponding to a first subset including the copied second complex-valued symbol in the first set is $x_l[1]$ described above, and a time domain vector corresponding to a second subset including the second complex-valued symbol copied from the first set to the second set is $x_{l+1}[2]$ described above.

This copying manner may be referred to as backward copying.

The second copying operation performed on the first set and the second set in step S1230 is still used as an example. Optionally, in step S1230, the second complex-valued symbol in the second set is copied to the first set.

For example, a time domain vector corresponding to a second subset including the copied second complex-valued symbol in the second set is $x_{l+1}[2]$ described above, and a time domain vector corresponding to a first subset including the second complex-valued symbol copied from the second set to the first set is $x_l[1]$ described above.

This copying manner may be referred to as forward copying.

The foregoing implementations of the forward copying and backward copying may also be applicable to the first copying operation on the first set and the second set. Details are not described herein again.

Optionally, the third copying operation may be replaced with the first copying operation and signal processing. The signal processing may shift a set in time domain.

Figure 13:
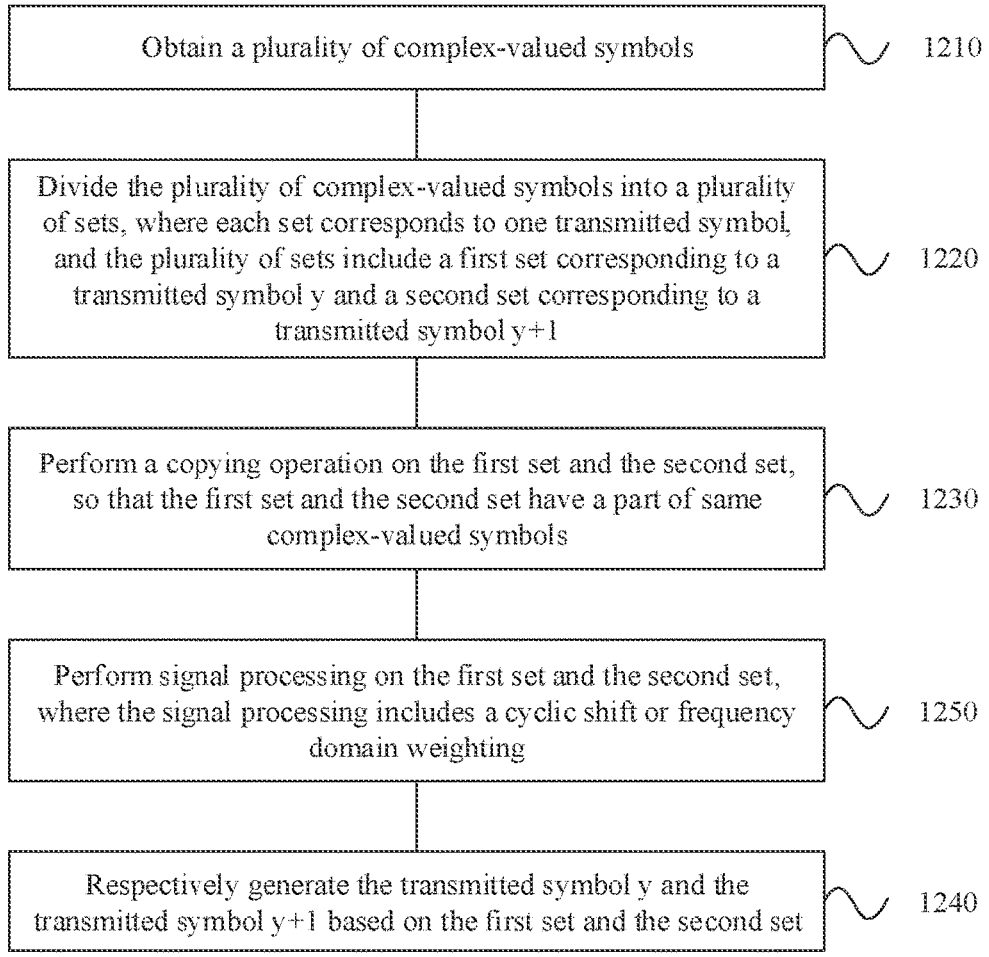
FIG. 13 is another schematic flowchart of a method for generating a transmitted symbol according to an embodiment of this application.

Optionally, as shown in FIG. 13, in the embodiment shown in FIG. 12, after step S1230 and before step S1240, the method further includes step S1250.

Step S1250: Perform signal processing on the first set and the second set, where the signal processing includes a cyclic shift or frequency domain weighting.

It should be understood that, in step S1250, the first set and the second set on which the copying operation is performed are processed.

It should further be understood that if the signal processing in step S1250 is the cyclic shift, in step S1250, signal processing is performed on a time domain signal corresponding to the first set and a time domain signal corresponding to the second set, or if the signal processing in step S1250 is the frequency domain weighting, in step S1250, frequency domain weighting is performed on a frequency domain signal corresponding to the first set and a frequency domain signal corresponding to the second set.

An execution window of step S1250 varies with an application scenario.

In the application scenario 1, an execution occasion of step S1250 may include ①, ②, or ③ shown in FIG. 10.

Optionally, on an occasion indicated by ① in FIG. 10, step S1250 is performed before DFT.

For example, in step S1250, the cyclic shift is performed on the first set and the second set.

Optionally, on an occasion indicated by ② in FIG. 10, step S1250 is performed after DFT and before IFFT.

For example, in step S1250, DFT is performed on the first set and the second set to separately obtain the frequency domain signals of the first set and the second set, and then frequency domain weighting is performed on the frequency domain signals of the first set and the second set, to equivalently implement the cyclic shift on the first set and the second set.

Optionally, on an occasion indicated by ③ in FIG. 10, step S1250 is performed after IFFT and before the CP is added.

It should be understood that time-domain symbols in the first set and the second set may be obtained by performing IFFT on the first set and the second set.

For example, in step S1250, the cyclic shift is performed on the time domain symbols of the first set and the second set.

In the application scenario 2, on an occasion indicated by ④ in FIG. 11, step S1250 is performed after the copying operation and before the CP is added.

Optionally, in the embodiment shown in FIG. 13, step S1230 includes: performing the second copying operation on the first set and the second set. Step S1250 includes: respectively performing the cyclic shift on the first set and the second set based on a same step and direction, so that an end location of the first subset including the second complex-valued symbol in the first set corresponds to a location after the first reference point of the transmitted symbol y, and an end location of the second subset including the second complex-valued symbol in the second set corresponds to a location after the second reference point of the transmitted symbol y+1.

It should be understood that because the cyclic shift is performed on the first set and the second set by using the same step and direction, a symbol component whose end location is the first reference point in the transmitted symbol y can be the same as a symbol component whose end location is the second reference point in the transmitted symbol y+1.

It should further be understood that, in this embodiment, the second copying operation is performed on the first set and the second set, and the cyclic shift in step S1250 is performed, to generate, based on the first set, the transmitted symbol 1 shown in FIG. 7, and generate, based on the second set, the transmitted symbol 2 shown in FIG. 7 (it is assumed that the transmitted symbol 1 and the transmitted symbol 2 shown in FIG. 7 each has the symbol component D2).

It should be understood that, in this embodiment, the cyclic shift is performed on the set obtained through the copying operation, to reduce impact of a tailing effect of a filter on extension of a guard interval between symbols to some extent.

In step S1230, the copying operation is performed, so that the first set and the second set have the part of same complex-valued symbols. For ease of description and understanding, in the following, a subset including the part of same complex-valued symbols in the first set is referred to as a first subset, and a subset including the part of same complex-valued symbols in the second set is referred to as a second subset. It should be understood that the first subset and the second subset have a same length, and the first subset and the second subset include the same complex-valued symbols.

Optionally, in some embodiments, a time domain location of the first subset may be different from that of the second subset. To be specific, a time domain index of a start location of the first subset is different from that of a start location of the second subset, and a time domain index of an end location of the first subset is different from that of an end location of the second subset.

Optionally, in some embodiments, the time domain location of the first subset may be the same as that of the second subset. To be specific, the time domain index of the start location of the first subset is the same as that of the start location of the second subset, and the time domain index of the end location of the first subset is the same as from that of the end location of the second subset.

In this specification, a copying operation that enables the time domain location of the first subset to be the same as that of the second subset is referred to as a same-location copying operation.

Optionally, the first copying operation, the second copying operation, or the third copying operation performed on the first set and the second set in step S1230 may be replaced with a same-location copying operation and signal processing that are performed the first set and the second set. The signal processing may shift at least one of the first set and the second set in time domain. The signal processing may be implemented by using a cyclic shift or frequency domain weighting.

Optionally, in the embodiment shown in FIG. 13, step S1230 includes: performing the same-location copying operation on the first set and the second set. Step S1250 includes: performing signal processing on the first set and the second set, to shift at least one of the first set and the second set in time domain. The signal processing in step S1250 includes the cyclic shift or the frequency domain weighting.

The signal processing performed on the first set and the second set in step S1250 may include the following plurality of types of signal processing.

A First Type of Signal Processing;

When the transmitted symbol y and the transmitted symbol y+1 respectively correspond to the first transmitted symbol and the second transmitted symbol in the foregoing embodiment, for example, the transmitted symbol y and the transmitted symbol y+1 are respectively the transmitted symbol x and the transmitted symbol x+1 in FIG. 4, in step S1250, the first type of signal processing is performed on the first set and the second set, so that the start location of the first subset corresponds to the third reference point of the transmitted symbol y, and the start location of the second subset corresponds to the second reference point of the transmitted symbol y+1.

A Second Type of Signal Processing:

When the transmitted symbol y and the transmitted symbol y+1 respectively correspond to the fourth transmitted symbol and the third transmitted symbol in the foregoing embodiment, for example, the transmitted symbol y and the transmitted symbol y+1 are respectively the transmitted symbol x and the transmitted symbol x+1 in FIG. 6, in step S1250, the second type of signal processing is performed on the first set and the second set, so that the end location of the first subset corresponds to the first reference point of the transmitted symbol y, and the end location of the second subset corresponds to the second reference point of the transmitted symbol y+1.

A Third Type of Signal Processing:

When the transmitted symbol y and the transmitted symbol y+1 respectively not only correspond to the first transmitted symbol and the second transmitted symbol in the foregoing embodiment, but also correspond to the fourth transmitted symbol and the third transmitted symbol in the foregoing embodiment, for example, the transmitted symbol y and the transmitted symbol y+1 are respectively the transmitted symbol 1 and the transmitted symbol 2 in FIG. 7, in step S1250, the third type of signal processing is performed on the first set and the second set, so that the start location of the first subset corresponds to the location before the first reference point of the transmitted symbol y, the end location of the first subset corresponds to the location after the first reference point of the transmitted symbol y, the start location of the second subset corresponds to the location before the second reference point of the transmitted symbol y+1, and the end location of the second subset corresponds to the location after the second reference point of the transmitted symbol y+1.

Optionally, the third type of signal processing may include two times of signal processing.

For example, in step S1250, first signal processing is separately performed on the first set and the second set, so that the end location of the first subset corresponds to the first reference point of the transmitted symbol y, and the end location of the second subset corresponds to the second reference point of the transmitted symbol y+1. Second signal processing is performed on both a signal obtained after the first signal processing is performed on the first set and a signal obtained after the first signal processing is performed on the second set, so that the start location of the first subset corresponds to the location before the first reference point of the transmitted symbol y, the end location of the first subset corresponds to the location after the first reference point of the transmitted symbol y, the start location of the second subset corresponds to the location before the second reference point of the transmitted symbol y+1, and the end location of the second subset corresponds to the location after the second reference point of the transmitted symbol y+1.

The second signal processing may be understood as a common shift operation performed on the first set and the second set.

The first signal processing includes a cyclic shift or frequency domain weighting, and the second signal processing includes a cyclic shift or frequency domain weighting. If the first signal processing is the cyclic shift, the second signal processing is also the cyclic shift. If the first signal processing is the frequency domain weighting, the second signal processing may be the frequency domain weighting or the cyclic shift.

"The start location of the first subset corresponds to the location before the first reference point of the transmitted symbol y, and the end location of the first subset corresponds to the location after the first reference point of the transmitted symbol y" mentioned above means that the start location of the first subset in the first set corresponds to a tail location of the transmitted symbol y, and the end location of the first subset corresponds to a header location of the transmitted symbol y.

It should be noted that a premise of "the start location of the first subset corresponds to the location before the first reference point of the transmitted symbol y, and the end location of the first subset corresponds to the location after the first reference point of the transmitted symbol y" mentioned in this specification is that signal processing is performed on the first set, that is, the cyclic shift or frequency domain weighting is performed on the first set. It should be understood that, on a premise of the cyclic shift (or frequency domain weighting), "the end location of the first subset corresponds to the location after the first reference point of the transmitted symbol y" may be understood as "the end location of the first subset corresponds to a header location of the transmitted symbol y" or "the end location of the first subset corresponds to a location after the third reference point of the transmitted symbol y". Alternatively, from a perspective of a time domain structure of the first transmitted symbol, "the end location of the first subset corresponds to the location after the first reference point of the transmitted symbol y" may be expressed as "the end location of the first subset corresponds to the location before the first reference point of the transmitted symbol y".

It should further be noted that this specification is intended to describe a case in which a time domain location corresponding to the time domain location of the first subset in the transmitted symbol y covers a first reference point of the first transmitted symbol (namely, an end location of the first transmitted symbol). Therefore, the following description manner is used: "The start location of the first subset corresponds to the location before the first reference point of the transmitted symbol y, and the end location of the first subset corresponds to the location after the first reference point of the transmitted symbol y".

Figure 15:
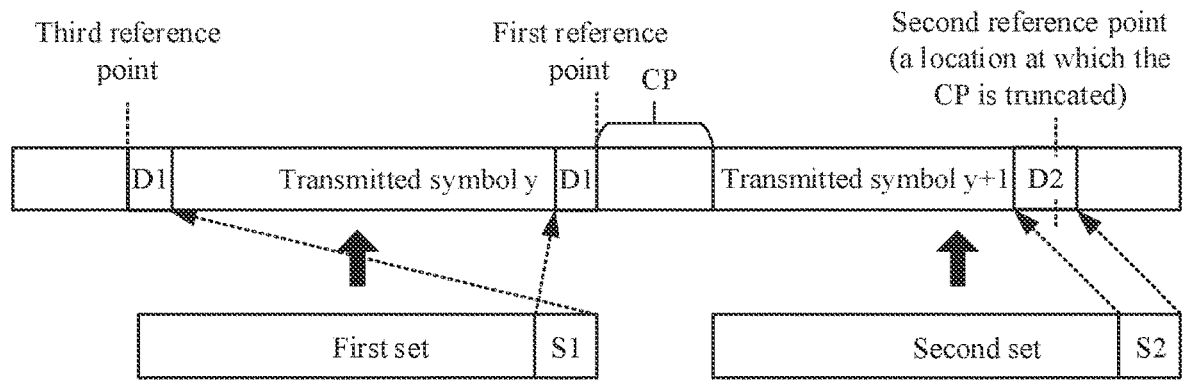
FIG. 15 is a schematic diagram of a correspondence between a set and a transmitted symbol when a cyclic shift is performed according to an embodiment of this application.

With reference to FIG. 15, the following provides an example of performing the same-location copying operation and signal processing in step S1250 on the first set and the second set. In FIG. 15, for example, a transmitted symbol y and a transmitted symbol y+1 that are to be generated have a same first symbol component and a same second symbol component. For example, the transmitted symbol y is the transmitted symbol 1 in FIG. 7, and the transmitted symbol y+1 is the transmitted symbol 2 in FIG. 7.

Figure 14:
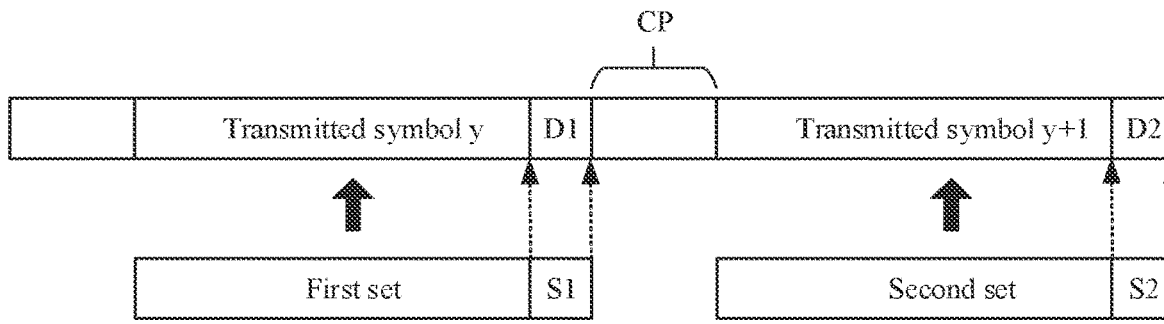
FIG. 14 is a schematic diagram of a correspondence between a set and a transmitted symbol when no cyclic shift is performed according to an embodiment of this application.

Before FIG. 15 is described, refer to FIG. 14. FIG. 14 shows a correspondence between a set and a transmitted symbol when step S1250 is not performed after the same-location copying operation is performed on the first set and the second set. To be specific, a transmitted symbol y in FIG. 14 is obtained based on the first set on which the same-location copying operation is performed and that is not processed in step S1250, and a transmitted symbol y+1 is obtained based on the second set on which the same-location copying operation is performed and that is not processed in step S1250.

As shown in FIG. 14, after the same-location copying operation is performed, the first set and the second set have some same complex-valued symbols (which are denoted as first complex-valued symbols below). The first complex-valued symbol may include a plurality of complex-valued symbols. A subset including the first complex-valued symbol in the first set is a subset S1 shown in FIG. 14, and a subset including the first complex-valued symbol in the second set is a subset S2 shown in FIG. 14. Time domain locations of the subset S1 and the subset S2 are the same. To be specific, start locations of the subset S1 and the subset S2 are the same, and end locations of the subset S1 and the subset S2 are also the same.

As shown in FIG. 14, a symbol component D1 in the transmitted symbol y is the same as a symbol component D2 in the transmitted symbol y+1, and time domain locations of the symbol component D1 and the symbol component D2 are the same. The subset S1 in the first set corresponds to the symbol component D1 in the transmitted symbol y, and the subset S2 in the second set corresponds to the symbol component D2 in the transmitted symbol y+1.

It can be seen from FIG. 14 that a location of the symbol component D1 in the transmitted symbol y is not shifted relative to a location of the subset S1 in the first set, and a location of the symbol component D2 in the transmitted symbol y+1 is not shifted relative to a location of the subset S2 in the second set.

FIG. 15 shows a correspondence between a set and a transmitted symbol when step S1250 is performed after the same-location copying operation is performed on the first set and the second set. To be specific, the transmitted symbol y in FIG. 15 is obtained based on the first set on which the same-location copying operation is performed and that is processed in step S1250, and the transmitted symbol y+1 is obtained based on the second set on which the same-location copying operation is performed and that is processed in step S1250.

For details about the first set and the second set in FIG. 15, refer to the foregoing descriptions. Details are not described herein again.

As shown in FIG. 15, a symbol component D1 in the transmitted symbol y is the same as a symbol component D2 in the transmitted symbol y+1. A start location of the symbol component D1 is located before a first reference point of the transmitted symbol y, and an end location of the symbol component D1 is located after the first reference point of the transmitted symbol y (namely, a header of the transmitted symbol y). In other words, the end location of the symbol component D1 is located after a third reference point of the transmitted symbol y. A start location of a symbol component D2 is located before a second reference point of the transmitted symbol y+1. An end location of the symbol component D2 is located after the second reference point of the transmitted symbol y+1. The symbol component D1 in the transmitted symbol y corresponds to a subset S1 in the first set. The symbol component D2 in the transmitted symbol y+1 corresponds to a subset S2 in the second set.

It can be seen from FIG. 15 that a location of the symbol component D1 in the transmitted symbol y is shifted relative to a location of the subset S1 in the first set, and a location of the symbol component D2 in the transmitted symbol y+1 is shifted relative to a location of the subset S2 in the second set. It should be understood that this shift is implemented by using the signal processing in step S1250.

The following continues to describe an implementation of step S1250 by using an example in which a transmitted symbol y and a transmitted symbol y+1 have a same first symbol component and a same second symbol component. For example, the transmitted symbol y is a transmitted symbol 1 shown in FIG. 7, and the transmitted symbol y+1 is the transmitted symbol 2 shown in FIG. 7.

Optionally, in the embodiment shown in FIG. 13, a transmitted symbol is a DFT-s-OFDM symbol. Step S1250 includes the following steps:

performing frequency domain processing on the first set and the second set, to obtain a frequency domain signal corresponding to the first set and a frequency domain signal corresponding to the second set; performing IFFT on the frequency domain signal corresponding to first set and the frequency domain signal corresponding to the second set, to obtain a time domain signal corresponding to the first set and a time domain signal corresponding to the second set; and performing a cyclic shift on the time domain signal corresponding to the first set and the time domain signal corresponding to the second set, so that the start location of the first subset corresponds to a location before a first reference point of the transmitted symbol y, the end location of the first subset corresponds to a location after the first reference point of the transmitted symbol y, the start location of the second subset corresponds to a location before a second reference point of the transmitted symbol y+1, and the end location of the second subset corresponds to a location after the second reference point of the transmitted symbol y+1.

The performing frequency domain processing on the first set and the second set means performing DFT on the first set and the second set.

It should be understood that, in this embodiment, the shift shown in FIG. 15 is implemented in step S1250 by using the cyclic shift.

In this embodiment, step S1250 may be performed on the occasion shown by ( ) in FIG. 10.

Figure 16:
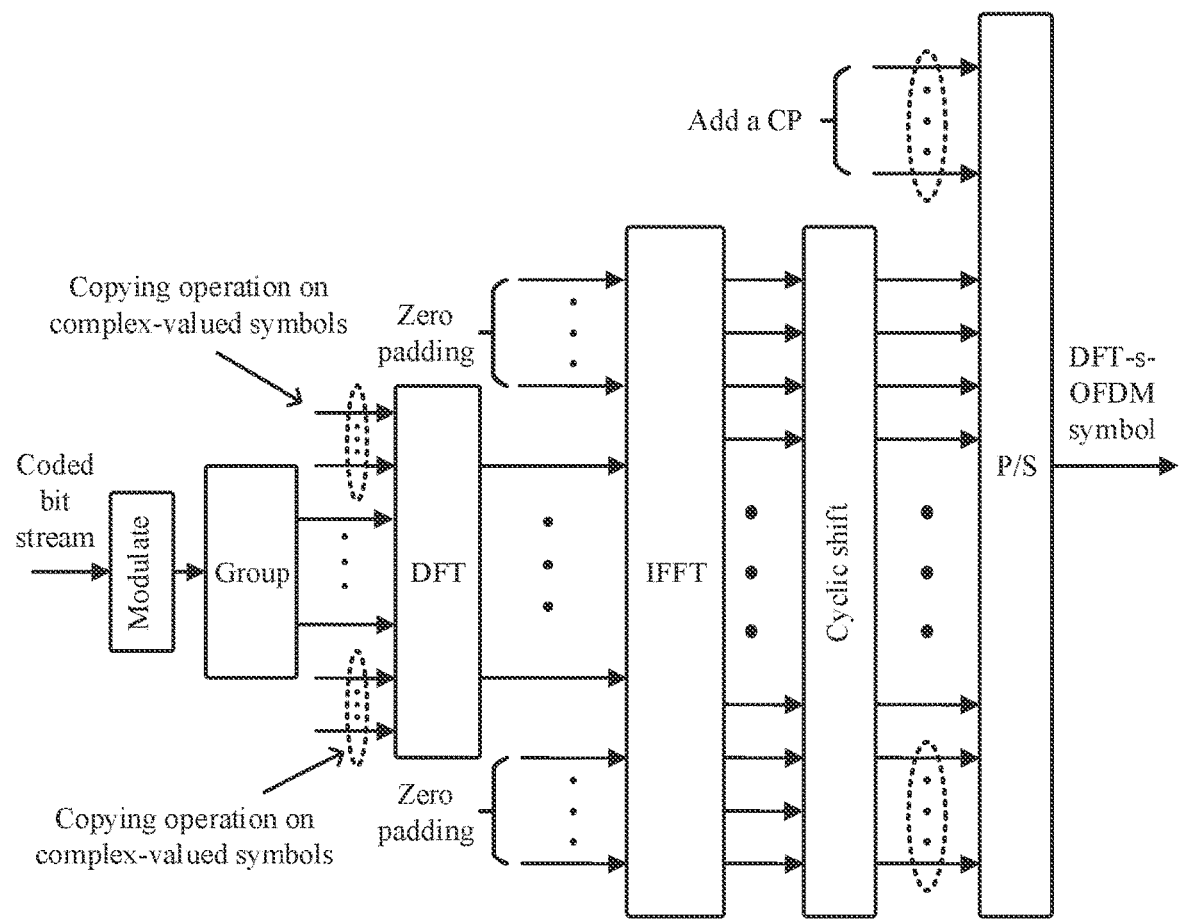
FIG. 16 is another schematic flowchart of generating a transmitted symbol according to an embodiment of this application.

For example, the transmitted symbol is a DFT-s-OFDM symbol. A procedure of generating the DFT-s-OFDM symbol in this application is shown in FIG. 16. The procedure includes the following steps. A coded bit stream is modulated to obtain a plurality of modulated symbols. The modulated symbols may be referred to as complex-valued symbols. This step may correspond to step S1210. The plurality of complex-valued symbols are grouped to obtain a plurality of sets. This step corresponds to step S1220. A complex-valued symbol copying operation is performed on the plurality of sets. This step may correspond to step S1230. DFT is performed on a signal on which the copying operation is performed. M-point frequency domain elements obtained after DFT are mapped to M consecutive subcarriers (not shown in FIG. 16), and a transmit end inserts zero or maps a remaining signal to a subcarrier other than the M subcarriers. After the subcarrier mapping, IFFT is performed on a frequency domain signal. A cyclic shift is performed on the signal on which IFFT is performed. This step may correspond to step S1250. A CP is added to a signal on which the cyclic shift is performed, and parallel-to-serial conversion (P/S) is performed to finally obtain the DFT-s-OFDM symbol. This step may correspond to step S1240.

For example, the grouping in this embodiment of this application may be implemented by performing serial/parallel (S/P) conversion.

Optionally, in the embodiment shown in FIG. 13, a transmitted symbol is a DFT-s-OFDM symbol. Step S1250 includes the following operations.

Discrete Fourier transformation (DFT) is performed on the first set and the second set, to obtain a frequency domain signal corresponding to the first set and a frequency domain signal corresponding to the second set. Frequency domain weighting is performed on the frequency domain signal corresponding to the first set and the frequency domain signal corresponding to the second set, so that the start location of the first subset corresponds to a location before the first reference point of the first transmitted symbol, the end location of the first subset corresponds to a location after a first reference point of the transmitted symbol y, the start location of the second subset corresponds to a location before a second reference point of the transmitted symbol y+1, and the end location of the second subset corresponds to a location after the second reference point of the transmitted symbol y+1.

It should be understood that, in this embodiment, the shift shown in FIG. 15 is equivalently implemented in step S1250 in a frequency domain weighting manner.

In this embodiment, step S1250 may be performed on the occasion shown by ②  in FIG. 10.

For example, the transmitted symbol is a DFT-s-OFDM symbol. A procedure of generating the DFT-s-OFDM symbol in this application includes the following steps. A coded bit stream is modulated to obtain a plurality of modulated symbols. The modulated symbols may be referred to as complex-valued symbols. This step may correspond to step S1210. The plurality of complex-valued symbols are grouped to obtain a plurality of sets. This step corresponds to step S1220. A complex-valued symbol copying operation is performed on the plurality of sets. This step may correspond to step S1230. DFT is performed on a signal on which the copying operation is performed. Frequency domain weighting is performed on M-point frequency domain elements after the DFT. The M-point frequency domain elements on which the frequency domain weighting is performed are mapped to M consecutive subcarriers, and a transmit end inserts zero or maps a remaining signal to a subcarrier other than the M subcarriers. After the subcarrier mapping, IFFT is performed on a frequency domain signal. A cyclic shift is performed on the signal on which IFFT is performed. This step may correspond to step S1250. A CP is added to a signal on which the cyclic shift is performed, to finally obtain the DFT-s-OFDM symbol. This step may correspond to step S1240.

For example, when frequency domain weighting is performed on the frequency domain signal corresponding to the first set and the frequency domain signal corresponding to the second set, a used weight meets the following formula:

$$C(k, l) = C_0(l) \cdot \exp(j 2\pi k n_0(l) / P)$$

$C(k,l)$ represents the weight. $C_0(l)$ is related to a symbol number l, and is a constant in a transmitted symbol. A specific value of $C_0(l)$ is not limited in this application. Optionally, $C_0(l)=1$. j represents the complex-valued symbol, that is, $j=\sqrt{-1}$.

There is a possible value of P: $P=N_u$ or $P=M$. $N_u$ represents a length of a symbol without a CP after IFFT, and M represents a quantity of DFT points.

There are two possible values of P: $P=N_u$ and $P=M$. $N_u$ represents a length of a symbol without a CP after IFFT, and M represents a quantity of DFT points.

It is assumed that a shift value after the IFFT is a CP length, namely, $N_{CP,l}$. A value of an equivalent frequency domain weighting parameter is as follows: When $P=N_u$, $n_0(l)=N_{CP,i}$, or when $P=M$, $n_0(l)=M \cdot N_{CP,i}/N_u$.

A shift value of a transmitted symbol whose symbol number is 1 is $N_l + \Sigma_{o=o1} N_{CP,o}$. When $P=N_u$, $n_0(l)=N_1 + \Sigma_{o=o1} N_{CP,o}$. When $P=M$, $n_0(l)=n_0(1)+M \cdot \Sigma_{o=o1} N_{CP,o}/N_u$.

o1 indicates an accumulated start symbol, and a value of o1 may be 0, 1, 2, or the like. $N_1$ indicates an initial shift value, and $N_1$ may be set.

Correspondingly, $n_0(1)=M \cdot N_1/N_u$ may be obtained.

Optionally, a value of $n_0(1)$ may be calculated by using $N_1$.

Optionally, a value of $n_0(1)$ may be directly defined by using a protocol.

Optionally, in some embodiments, an equivalent shift value of a transmitted symbol whose symbol number is l+1 $N_{CP,l+1}$ more than an equivalent shift value of the transmitted symbol whose symbol number is $l$.

It may be understood that, the following may be accordingly obtained:

$$\frac{C(k, l+1)}{C(k, l)} = \frac{C_0(l+1)}{C_0(l)} \exp(j2\pi k N_{CP,l+1}/N_u)$$

Optionally, a value of $N_{CP,l+1}/N_u$ may be directly defined by using a protocol.

For example, in the existing NR protocol, a possible value is $$\frac{N_{CP,l+1}}{N_u} = \frac{144}{2048}.$$

In the application scenario 2, a cyclic shift is performed after a copying operation and before a CP is added, for example, on the occasion shown by □ in FIG. 11.

Optionally, in the embodiment shown in FIG. 13, a transmitted symbol is a DFT-s-OFDM symbol or an SC-QAM symbol, the signal processing in step S1250 includes the cyclic shift. Step S1250 includes the following operations: directly performing the cyclic shift on the first set and the second set that are obtained in step S1230, so that the start location of the first subset corresponds to the location before the first reference point of the transmitted symbol y, the end location of the first subset corresponds to the location after the first reference point of the transmitted symbol y, the start location of the second subset corresponds to the location before the second reference point of the transmitted symbol y+1, and the end location of the second subset corresponds to the location after the second reference point of the transmitted symbol y+1.

In this embodiment, the cyclic shift may be performed on the occasion shown by G in FIG. 10. Alternatively, in this embodiment, the cyclic shift may be performed on the occasion shown by ④ in FIG. 11.

Optionally, in the embodiment in which step S1230 is the same-location copying operation, the copying operation enables the first set and the second set to have a part of same complex-valued symbols. A subset including the part of same complex-valued symbols in the first set is denoted as a first subset. A subset including the part of same complex-valued symbols in the second set is denoted as a second subset. A time domain index of a start location of the first subset is the same as that of a start location of the second subset. The time domain index of the start location of the first subset is related to a CP length and a symbol number.

In other words, for two sets corresponding to two consecutive transmitted symbols, a location of a complex-valued symbol participating in a copying operation may be determined based on a symbol number of the transmitted symbol.

For example, in step S1230, the same-location copying operation is performed on the first set and the second set. A time domain index i of the start location of the first subset meets the following formula $$i = A + CL_{CP}(l)$$

l represents a symbol number of the first set. l=0 represents the 1st transmitted symbol in a signal stream. l=1 represents the 2nd transmitted symbol in the signal stream, and so on. A represents a time domain index of a first subset in a set whose symbol number l is 0. $CL_{CP}(l)$ represents an equivalent accumulated CP length of the first set whose symbol number is l, and represents an equivalent length, in a time domain vector before DFT, of a sum of CP lengths from a transmitted symbol whose symbol number is o1 to a transmitted symbol whose symbol number is l. o1 represents an accumulated start symbol, and a value of o1 may be 0, 1, 2, or the like.

CP lengths of transmitted symbols whose symbol numbers are different may be the same or different.

For example, the equivalent accumulated CP length $CL_{CP}(l)$ of the set whose symbol number is l meets the following formula:

$$CL_{CP}(l) = \left\lfloor M/N_u \sum_{o=o1}^{l} N_{cp,o} \right\rfloor$$

M represents a quantity of DFT points. $N_u$ represents a length of a symbol without a CP after IFFT. $N_{CP,o}$ represents a shift value (a CP length) of a set whose symbol number is o after IFFT. o1 represents the accumulated start symbol, and a value of o1 may be 0, 1, 2, or the like. $\lfloor \ \rfloor$ represents rounding down. The rounding down may be replaced with another rounding manner.

Optionally, in some embodiments, if the CP lengths of the transmitted symbols whose symbol numbers are different in the signal stream are the same, in the first set and the second set on which the copying operation is performed, the time domain index i of the start location of the first subset meets the following formula:

$$i = A + l \cdot L_{CP}$$

l represents the symbol number of the first set. l=0 represents the 1st transmitted symbol in the signal stream, l=1 represents the 2nd transmitted symbol in the signal stream, and so on. A represents the time domain index of the first subset in the set whose symbol number l is 0. $L_{CP}$ represents an equivalent length of the CP length in the time domain vector before DFT.

It should further be understood that, in step S1230, the time domain index of the start location of the first subset is the same as that of the start location of the second subset. Therefore, a time domain index i of the start location of the second subset also meets the foregoing formula.

It should be understood that copying locations (namely, time domain indexes of copied symbol components) at which the copying operation is performed on two sets corresponding to two transmitted symbols whose symbol numbers are l and l+1 are different from copying locations at which the copying operation is performed on two sets corresponding to two transmitted symbols whose symbol numbers are l+1 and l+2.

Figure 17:
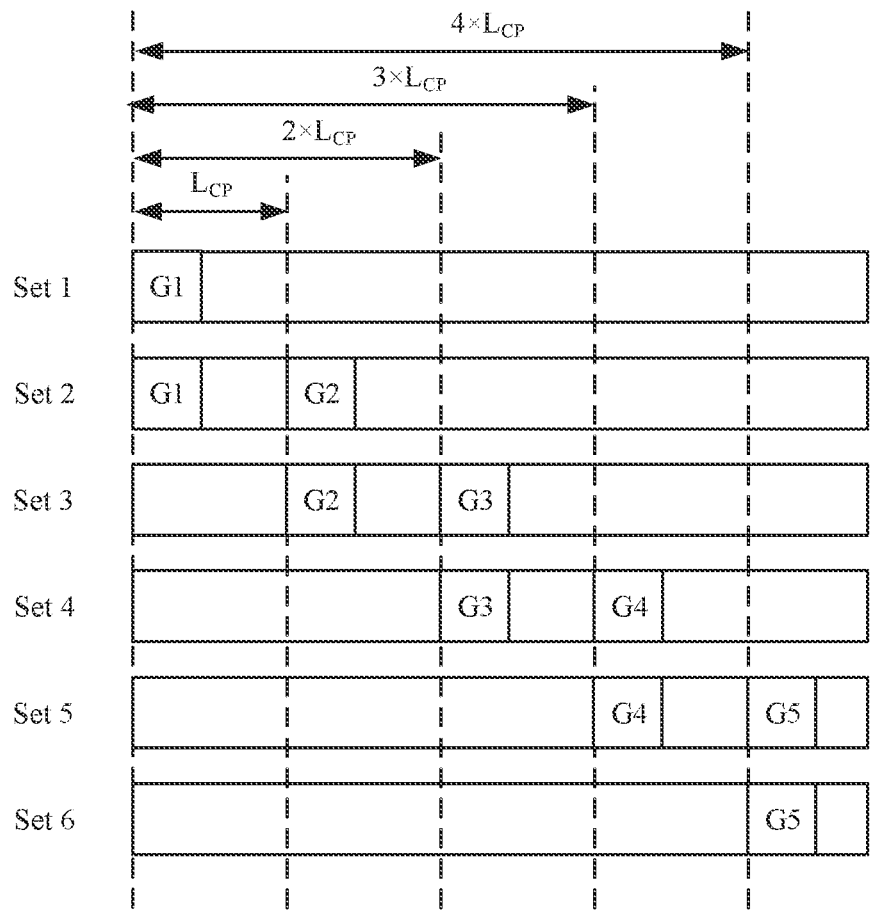
FIG. 17 is a schematic diagram in which a copying operation is performed on a plurality of sets according to an embodiment of this application.

As an example but not a limitation, FIG. 17 is a schematic diagram of time domain structures obtained after a same-location copying operation is performed on a plurality of sets corresponding to a plurality of time domain symbols that are continuous in time domain.

In FIG. 17, it is assumed that a symbol number of a set 1 is 0, a symbol number of a set 2 is 1 . . . , and a symbol number of a set 6 is 5. CP lengths of transmitted symbols corresponding to sets whose symbol numbers are different are the same. A time domain index A of a subset participating in the copying operation in the set 1 whose symbol number is 0 is 0.

As shown in FIG. 17, the set 1 and the set 2 each has a subset G1 including complex-valued symbols, and locations of the subset G1 in the set 1 and the set 2 are the same; the set 2 and a set 3 each has a subset G2, and locations of the subset G2 in the set 2 and the set 3 are the same; and so on. For the set 1 and the set 2, a time domain index of the subset G1 is 0. For the set 2 and the set 3, a time domain index of the subset G2 is $L_{CP}$. For the set 3 and a set 4, a time domain index of a subset G3 is $i=A+l \cdot L_{CP}=2L_{CP}$. For the set 4 and a set 5, a time domain index of a subset G4 is $i=A+l \cdot L_{CP}=3L_{CP}$. For the set 5 and the set 6, a time domain index of a subset G5 is $i=A+l \cdot L_{CP}=4L_{CP}$. $L_{CP}$ represents an equivalent length of a CP length in a time domain vector before DFT.

Optionally, in the following case, in step S1250, no cyclic shift may be performed on the first set, and the cyclic shift is performed only on the second set.

Step S1230 includes: A copying operation is performed on the first set and the second set, so that the first set and the second set have a part of same complex-valued symbols. A subset including the part of same complex-valued symbols in the first set is denoted as a first subset. A subset including the part of same complex-valued symbols in the second set is denoted as a second subset. A time domain index of a start location of the first subset is the same as that of a start location of the second subset. The start location of the first subset corresponds to the location before the first reference point of the transmitted symbol y. The end location of the first subset corresponds to the location after the first reference point of the transmitted symbol y. The start location of the second subset corresponds to the location before the first reference point of the transmitted symbol y+1. The end location of the second subset corresponds to the location after the first reference point of the transmitted symbol y+1.

Optionally, in some embodiments, the signal processing in step S1250 includes the cyclic shift. A cyclic shift step for the first set is determined based on a CP length and a symbol number of the transmitted symbol y. A cyclic shift step for the second set is determined based on a CP length and a symbol number of the transmitted symbol y+1.

For example, l represents a symbol number of a transmitted symbol. It is assumed that l=0 corresponds to the $1^{st}$ transmitted symbol in a signal stream, l=1 corresponds to the $2^{nd}$ transmitted symbol in the signal stream, and so on. On this assumption, in step S1250, a cyclic shift step Z(l) of a set whose symbol number is l satisfies the following formula:

$$Z(l) = Z_0 + \sum_{o=o1}^{l} N_{cp,o}$$

$Z_0$ represents a cyclic shift step of a set whose symbol number is 0.

$$\sum_{o=o1}^{l} N_{cp,o}$$

represents an equivalent accumulated CP length of a set whose symbol number is l, and represents an equivalent length, in a time domain vector after IFFT, of a sum of CP lengths from a transmitted symbol whose symbol number is o1 to a transmitted symbol whose symbol number is l.

CP lengths of transmitted symbols whose symbol numbers are different may be the same or different.

Optionally, in some embodiments, the CP lengths of the transmitted symbols whose symbol numbers are different in the signal stream are the same. A cyclic shift step Z(l) of the set whose symbol number is l satisfies the following formula:

$$Z(l) = Z_0 + l \cdot N_{CP}$$

$Z_0$ represents a cyclic shift step of a set whose symbol number is 0. The cyclic shift step of the set may be a preset value, for example, may be an empirical value. $N_{CP}$ represents an equivalent length of a CP length in a time domain vector after IFFT.

Figure 18:
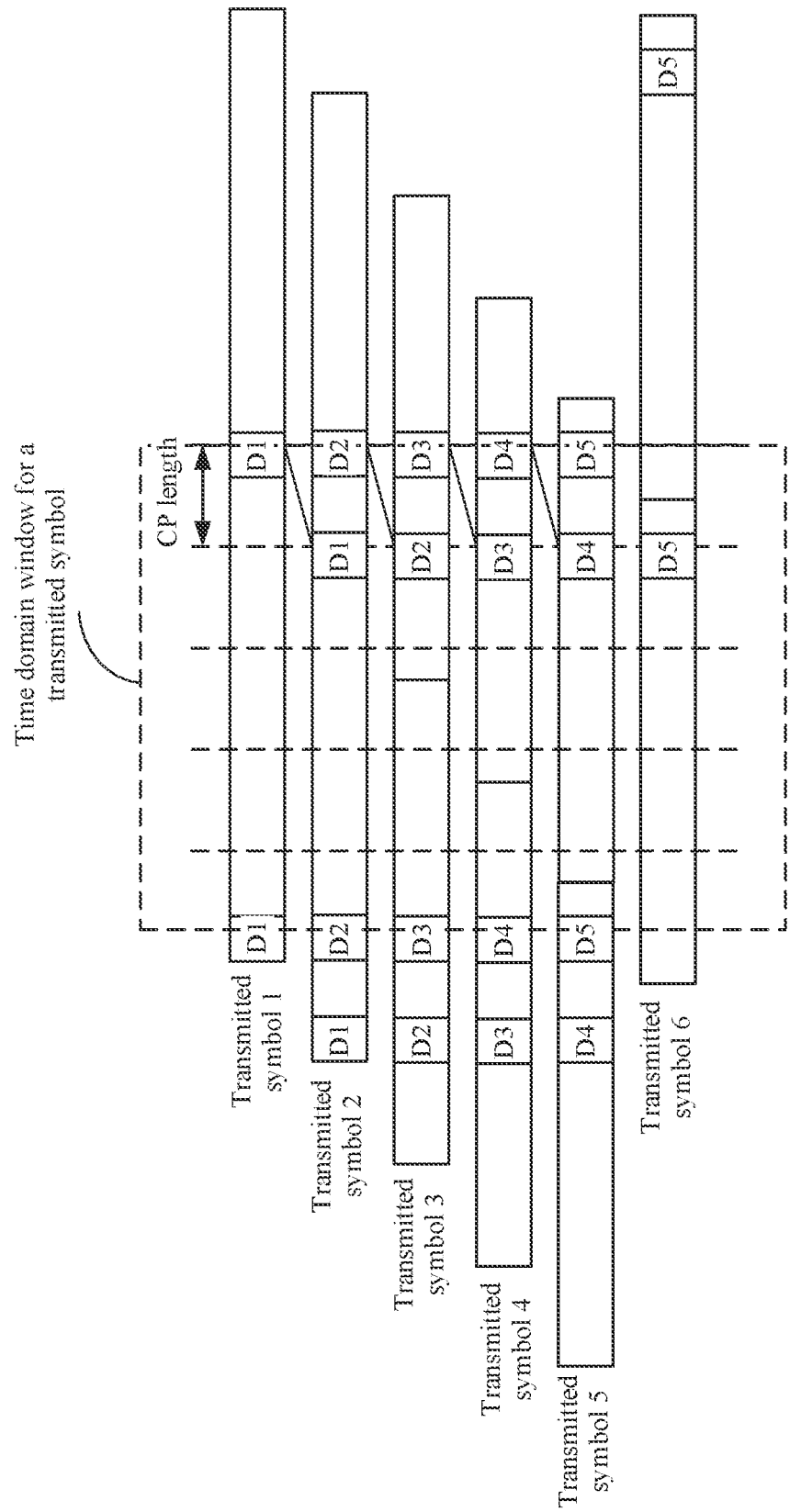
FIG. 18 is a schematic diagram in which a cyclic shift is performed on a plurality of symbols according to an embodiment of this application.

FIG. 18 is a schematic diagram in which a copying operation and signal processing (a cyclic shift or frequency domain weighting) are performed on a plurality of sets corresponding to a plurality of time domain symbols that are continuous in time domain.

As an example but not a limitation, in FIG. 18, six transmitted symbols located in a time domain window of transmitted symbols represent transmitted symbols that are continuous in time domain and that are generated by a set 1 to a set 6 that are processed in step S1230 and step S1250. In FIG. 18, a cyclic prefix (CP) of the transmitted symbol is not considered. In FIG. 18, symbol numbers of a transmitted symbol 1 to a transmitted symbol 6 are sequentially 0, 1 . . . , and 5.

It should be noted that, in FIG. 18, one time domain window for the transmitted symbols is drawn for better understanding of the cyclic shift. This time domain window is merely for ease of understanding and description, and constitutes no limitation on this embodiment of this application.

It may be equivalently considered that the transmitted symbol 1 in FIG. 18 is a transmitted symbol obtained by performing signal processing (a cyclic shift or frequency domain weighting) on the set 1 in FIG. 17, the transmitted symbol 2 in FIG. 18 is a transmitted symbol obtained by performing signal processing (a cyclic shift or frequency domain weighting) on the set 2 in FIG. 17, . . . , and the transmitted symbol 6 in FIG. 18 is a transmitted symbol obtained by performing signal processing (a cyclic shift or frequency domain weighting) on the set 6 in FIG. 17.

It can further be understood from FIG. 18 that a difference between a cyclic shift step of a transmitted symbol whose symbol number is l+1 and a cyclic shift step of a transmitted symbol whose the symbol number is l one CP length. It is assumed herein that CP lengths of transmitted symbols whose symbol numbers are different are the same.

This embodiment of this application may be applied to generation of the DFT-s-OFDM symbol and the SC-QAM symbol. In addition, this application may further be applied to generation of a reference signal, for example, a demodulation reference signal (DMRS).

For the DFT-s-OFDM waveform, the reference signal is usually generated in frequency domain and directly mapped to a subcarrier.

In a possible implementation, when the transmitted symbol is a reference signal, the copying operation in this embodiment of this application is performed after a frequency domain sequence of the reference signal is converted into a time domain sampling value.

Considering that the reference signal is used to estimate a channel, to ensure channel performance, a time domain sampling point including another symbol is not desirable in the reference signal.

Optionally, in this embodiment of this application, if a transmitted symbol x is a reference signal, and transmitted symbols before and after the transmitted symbol x are non-reference signals, forward copying is performed in step S1230 for transmitted symbols before the transmitted symbol x (including the reference signal x), and backward copying is performed in step S1230 for reference signals after the transmitted symbol x (including the reference signal x).

In this embodiment, a guard interval between symbols can be flexibly configured, and integrity of a reference signal can also be ensured.

Figure 19:
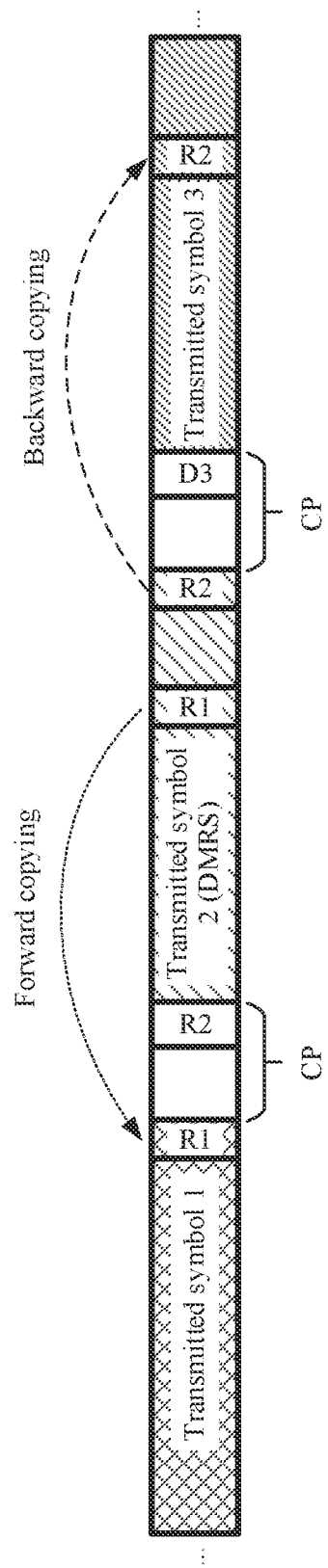
FIG. 19 is yet still another schematic diagram of a time domain structure of a transmitted symbol according to an embodiment of this application.

FIG. 19 is a schematic diagram of time domain structures of three transmitted symbols (1, 2, and 3). The transmitted symbol 2 is a DMRS. The transmitted symbol 1 and the transmitted symbol 3 are non-reference signals. A copying relationship between a set 2 corresponding to the transmitted symbol 2 and a set 1 corresponding to the transmitted symbol 1 is forward copying. A copying relationship between the set 2 corresponding to the transmitted symbol 2 and a set 3 corresponding to the transmitted symbol 3 is backward copying.

It can be learned from FIG. 19 that a symbol component R1 whose end location is a second reference point in the transmitted symbol 2 is copied to the transmitted symbol 1. An end location of the symbol component R1 copied to the transmitted symbol 1 is a first reference point of the transmitted symbol 1. A symbol component R2 whose end location is a first reference point in the transmitted symbol 2 is copied to the transmitted symbol 3. An end location of the symbol component R2 copied to the transmitted symbol 3 is a first reference point of the transmitted symbol 3.

As shown in FIG. 19, a copying relationship between the transmitted symbol 2 and the symbol 1 is forward copying. To be specific, the symbol component R1 in the DMRS is forward copied to the symbol 1, and by analogy, a symbol component D0 in the symbol 1 is forward copied to a symbol (not shown in FIG. 19) before the symbol 1. A copying relationship between the DMRS and the symbol 3 is backward copying. To be specific, the symbol component R2 in the DMRS is backward copied to the symbol 3, and by analogy, a symbol component D3 in the symbol 3 is copied to a symbol (not shown in FIG. 19) after the symbol 3.

It should be understood that, in this embodiment, a guard interval between symbols can be flexibly configured, and accuracy of a reference signal can also be ensured, to ensure channel performance.

Figure 20:
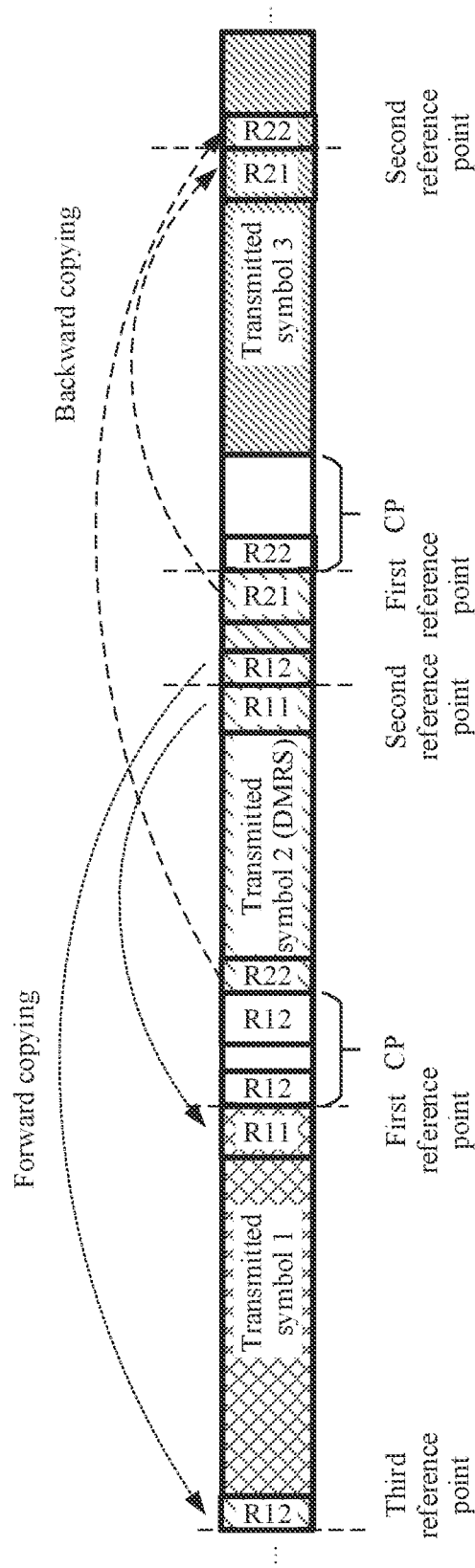
FIG. 20 is yet still another schematic diagram of a time domain structure of a transmitted symbol according to an embodiment of this application.

FIG. 20 is a schematic diagram of time domain structures of three transmitted symbols (1, 2, and 3). The transmitted symbol 2 is a DMRS. The transmitted symbol 1 and the transmitted symbol 3 are non-reference signals. A copying relationship between a set 2 corresponding to the transmitted symbol 2 and a set 1 corresponding to the transmitted symbol 1 is forward copying. A copying relationship between the set 2 corresponding to the transmitted symbol 2 and a set 3 corresponding to the transmitted symbol 3 is backward copying.

It can be learned from FIG. 20 that a symbol component R12 whose start location is a second reference point in the transmitted symbol 2 is copied to the transmitted symbol 1. A start location of the symbol component R12 copied to the transmitted symbol 1 is a third reference point of the transmitted symbol 1. A symbol component R11 whose end location is the second reference point in the transmitted symbol 2 is copied to the transmitted symbol 1. An end location of the symbol component R11 copied to the transmitted symbol 1 is a first reference point of the transmitted symbol 1. A symbol component R21 whose end location is a first reference point in the transmitted symbol 2 is copied to the transmitted symbol 3. An end location of the symbol component R21 copied to the transmitted symbol 3 is a second reference point of the transmitted symbol 3. A symbol component R22 whose start location is a third reference point in the transmitted symbol 2 is copied to the transmitted symbol 3. A start location of the symbol component R22 copied to the transmitted symbol 3 is the second reference point of the transmitted symbol 3. The first reference point represents an end location of a transmitted symbol, the second reference point represents a location at which a CP is truncated in the transmitted symbol, and the third reference point represents a start location of the transmitted symbol (an end location of a CP), as shown in FIG. 20.

As shown in FIG. 20, a copying relationship between the transmitted symbol 2 and the transmitted symbol 1 is forward copying. To be specific, the symbol components R11 and R12 in the DMRS are copied to the symbol 1, and by analogy, a symbol component D0 in the transmitted symbol 1 is copied to a symbol (not shown in FIG. 20) before the symbol 1. A copying relationship between the DMRS and the transmitted symbol 3 is backward copying. To be specific, the symbol components R21 and R22 in the DMRS are copied to the transmitted symbol 3, and by analogy, a symbol component in the transmitted symbol 3 is copied to a symbol (not shown in FIG. 20) after the transmitted symbol 3.

It should be understood that, in this embodiment, a guard interval between symbols can be flexibly configured, and accuracy of a reference signal can also be ensured, to ensure channel performance.

When two or more transmitted symbols that are continuous in time domain are reference signals, this application provides a symbol processing method. The method includes the following steps.

Step (1): Obtain a plurality of complex-valued symbols.

Step (2): Divide the plurality of complex-valued symbols into a plurality of sets. The plurality of sets include a first set and a second set. The first set corresponds to a first transmitted symbol. The second set corresponds to a second transmitted symbol. The first transmitted symbol and the second transmitted symbol are continuous in time domain. The first transmitted symbol is located before the second transmitted symbol. A complex-valued symbol in a first subset in the first set is the same as that in a second subset in the second set.

For example, a time domain vector corresponding to the first set is the same as that corresponding to the second set.

Step (3): Perform signal processing on the first set and the second set. The signal processing includes a cyclic shift or frequency domain weighting. The signal processing enables a start location of the first subset to correspond to a location before a first reference point of the first transmitted symbol, an end location of the first subset to correspond to a location after the first reference point of the first transmitted symbol, a start location of the second subset corresponds to a location before a second reference point of the second transmitted symbol, and an end location of the second subset corresponds to a location after the second reference point of the second transmitted symbol. The first reference point represents an end location of a transmitted symbol, and the second reference point represents a location at which a cyclic prefix is truncated in the transmitted symbol.

Optionally, the transmitted symbols corresponding to the first set and the second set are reference signals, for example, DMRSs.

It should be understood that, in this embodiment, no copying operation is performed on the first set and the second set. When the transmitted symbols corresponding to the first set and the second set are reference signals, a guard interval between the reference signals can be flexibly configured when accuracy of the reference signals is ensured.

Based on the foregoing descriptions, in this embodiment of this application, a first transmitted symbol and a second transmitted symbol whose time domain structures are shown in FIG. 3 can be generated by performing a copying operation and signal processing including a cyclic shift or frequency domain weighting on two sets corresponding to two transmitted symbols that are continuous in time domain. Therefore, in this embodiment of this application, a guard interval between symbols can be flexibly configured when a CP length is fixed.

As described above, this application may be applied to short-packet transmission.

For example, the first transmitted symbol in this embodiment of this application may be the $1^{st}$ transmitted subsymbol in a second-type transmitted symbol sequence, or the first transmitted symbol may represent a previous one of any two adjacent transmitted subsymbols in a second-type transmitted symbol sequence. For another example, a third transmitted symbol in this embodiment of this application may represent a last one of any two adjacent transmitted subsymbols in the second-type transmitted symbol sequence. The second-type transmitted symbol sequence represents a transmitted symbol sequence including a plurality of transmitted subsymbols obtained through processing based on a single transmitted symbol.

When this application is applied to the short-packet transmission, a method for generating a transmitted symbol is similar to that described above except the following difference. For brevity, details are not described herein again.

The difference is: When the first transmitted subsymbol is not the $1^{st}$ transmitted subsymbol in the transmit sequence, the cyclic prefix of the first transmitted subsymbol is added before DFT is performed on the first set.

When the first transmitted subsymbol is $1^{st}$ transmitted subsymbol in the transmit sequence, the cyclic prefix of the first transmitted subsymbol may be added before DFT is performed on the first set, or may be added after DFT is performed on the first set.

Optionally, at least one transmitted subsymbol in the second-type transmitted symbol sequence is a channel demodulation reference signal.

It should be understood that, in addition to the embodiment provided in this specification, any other solution in which a transmitted symbol having the time domain structure shown in FIG. 4, FIG. 5, or FIG. 7 can be generated also falls within the protection scope of this application.

The embodiments described in this specification may be independent solutions, or may be combined based on internal logic. These solutions all fall within the protection scope of this application.

It may be understood that, in the foregoing method embodiments, an execution body may be a terminal device or a component (for example, a chip or a circuit) that may be used in a terminal device, or may be a network device or a component (for example, a chip or a circuit) that may be used in a network device.

The foregoing describes the method embodiments provided in embodiments of this application, and the following describes apparatus embodiments provided in embodiments of this application. It should be understood that descriptions of the apparatus embodiments correspond to the descriptions of the method embodiments. Therefore, for content not described in detail, refer to the foregoing method embodiments. For brevity, details are not described herein again.

Figure 21:
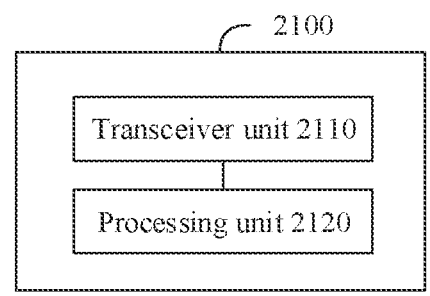
FIG. 21 is a schematic block diagram of a symbol processing apparatus according to an embodiment of this application.

FIG. 21 is a schematic block diagram of a communication apparatus 2100 according to an embodiment of this application. The communication apparatus 2100 includes a transceiver unit 2110 and a processing unit 2120. The transceiver unit 2110 may communicate with the outside, and the processing unit 2120 is configured to process data. The transceiver unit 2110 may also be referred to as a communication interface or a communication unit.

The communication apparatus 2100 may be configured to perform an action performed by the transmit end in the foregoing method embodiment, or may be configured to perform an action performed by the receive end in the foregoing method embodiment.

The communication apparatus 2100 may be a terminal device or a network device.

In a design, the communication apparatus 2100 is configured to perform the action performed by the transmit end in the foregoing method embodiment. The processing unit 2120 is configured to generate a first transmitted symbol in a transmitted symbol sequence. The first transmitted symbol and a second transmitted symbol have a same first symbol component. A start location of the first symbol component in the first transmitted symbol is a start location of the first transmitted symbol. A start location of the first symbol component in the second transmitted symbol is a location at which a cyclic prefix is truncated in the second transmitted symbol. The second transmitted symbol is a next transmitted symbol adjacent to the first transmitted symbol. The first transmitted symbol and the second transmitted symbol each has a cyclic prefix. The transceiver unit 2110 is configured to send the first transmitted symbol.

Optionally, the first transmitted symbol is the $1^{st}$ transmitted symbol in the transmitted symbol sequence.

Optionally, the processing unit 2120 is further configured to generate a third transmitted symbol in the transmitted symbol sequence. The third transmitted symbol and a fourth transmitted symbol have a same second symbol component. An end location of the second symbol component in the third transmitted symbol is a location at which a cyclic prefix is truncated in the third transmitted symbol. An end location of the second symbol component in the fourth transmitted symbol is an end location of the fourth transmitted symbol. The fourth transmitted symbol is a previous transmitted symbol adjacent to the third transmitted symbol. The third transmitted symbol and the fourth transmitted symbol each has a cyclic prefix. The transceiver unit 2110 is further configured to send the third transmitted symbol.

Optionally, the transmitted symbol sequence is a transmitted symbol sequence including a plurality of transmitted subsymbols obtained through processing based on a single transmitted symbol.

For example, at least one transmitted subsymbol in the transmitted symbol sequence is a channel demodulation reference signal.

Optionally, the processing unit 2120 is configured to: obtain a plurality of complex-valued symbols; divide the plurality of complex-valued symbols into a plurality of sets, where each set corresponds to one transmitted symbol, and the plurality of sets include a first set corresponding to the first transmitted symbol and a second set corresponding to the second transmitted symbol; perform a copying operation on the first set and the second set, so that the first set and the second set have a part of same complex-valued symbols; and generate the first transmitted symbol based on the first set.

For example, the processing unit 2120 is configured to perform step S1210 to step S1240.

Optionally, the transmitted symbol sequence is a transmitted symbol sequence including a plurality of transmitted subsymbols obtained through processing based on a single transmitted symbol. When the first transmitted symbol is not the $1^{st}$ transmitted symbol in the transmit sequence, the cyclic prefix of the first transmitted symbol is added before discrete Fourier transformation (DFT) is performed on the first set.

Optionally, the transmitted symbol sequence is a transmitted symbol sequence including a plurality of transmitted subsymbols obtained through processing based on a single transmitted symbol. When the first transmitted symbol is the $1^{st}$ transmitted symbol in the transmit sequence, the cyclic prefix of the first transmitted symbol is added after discrete Fourier transformation (DFT) is performed on the first set.

In another design, the communication apparatus 2100 is configured to perform the action performed by the receive end in the foregoing method embodiment. The processing unit 2120 is configured to: determine a first receive window used to receive a first transmitted symbol in a transmitted symbol sequence, where the first transmitted symbol and a second transmitted symbol have a same first symbol component; a start location of the first symbol component in the first transmitted symbol is a start location of the first transmitted symbol; a start location of the first symbol component in the second transmitted symbol is a location at which a cyclic prefix is truncated in the second transmitted symbol; the second transmitted symbol is a next transmitted symbol adjacent to the first transmitted symbol; and the first transmitted symbol and the second transmitted symbol each has a cyclic prefix; and adjust start time of the first receive window, so that the first receive window can completely receive the first transmitted symbol. The transceiver unit 2110 is configured to receive the first transmitted symbol by using an adjusted first receive window.

Optionally, the processing unit 2120 is configured to shift the start time of the first receive window backward by a first step. The first step is not greater than a length of the first symbol component.

Optionally, the first transmitted symbol is the $1^{st}$ transmitted symbol in the transmitted symbol sequence.

Optionally, the processing unit 2120 is further configured to determine a third receive window used to receive a third transmitted symbol in the transmitted symbol sequence. The third transmitted symbol and a fourth transmitted symbol have a same second symbol component. An end location of the second symbol component in the third transmitted symbol is a location at which a cyclic prefix is truncated in the third transmitted symbol. An end location of the second symbol component in the fourth transmitted symbol is an end location of the fourth transmitted symbol. The fourth transmitted symbol is a previous transmitted symbol adjacent to the third transmitted symbol. The third transmitted symbol and the fourth transmitted symbol each has a cyclic prefix. The transceiver unit 2110 is further configured to receive the third transmitted symbol by using the third receive window.

Optionally, the transmitted symbol sequence is a transmitted symbol sequence including a plurality of transmitted subsymbols obtained through processing based on a single transmitted symbol.

Optionally, at least one transmitted subsymbol in the transmitted symbol sequence is a channel demodulation reference signal.

In still another design, when a transmitted symbol sequence is a transmitted symbol sequence including a plurality of transmitted subsymbols obtained through processing based on a single transmitted symbol, the processing unit 2120 is configured to generate a first transmitted subsymbol in the transmitted symbol sequence. The transmitted symbol sequence is a transmitted symbol sequence including a plurality of transmitted subsymbols obtained through processing based on a single transmitted symbol. The transceiver unit 2110 is configured to send the first transmitted subsymbol.

The first transmitted subsymbol and a second transmitted subsymbol have a same first symbol component. A start location of the first symbol component in the first transmitted subsymbol is a start location of the first transmitted symbol. A start location of the first symbol component in the second transmitted subsymbol is a location at which a cyclic prefix is truncated in the second transmitted symbol. The second transmitted subsymbol is a next transmitted symbol adjacent to the first transmitted subsymbol. The first transmitted subsymbol and the second transmitted subsymbol each has a cyclic prefix.

Alternatively, the first transmitted subsymbol and a third transmitted subsymbol have a same second symbol component. An end location of the second symbol component in the first transmitted subsymbol is a location at which a cyclic prefix is truncated in the first transmitted subsymbol. An end location of the second symbol component in the third transmitted subsymbol is an end location of the third transmitted subsymbol. The third transmitted subsymbol is a previous transmitted symbol adjacent to the first transmitted subsymbol. The first transmitted subsymbol and the third transmitted subsymbol each has a cyclic prefix.

Optionally, the first transmitted subsymbol is the $1^{st}$ transmitted subsymbol in the transmitted symbol sequence.

Optionally, when the first transmitted subsymbol is not the $1^{st}$ transmitted subsymbol in the transmit sequence, the first transmitted subsymbol does not include the first symbol component.

Figure 22:
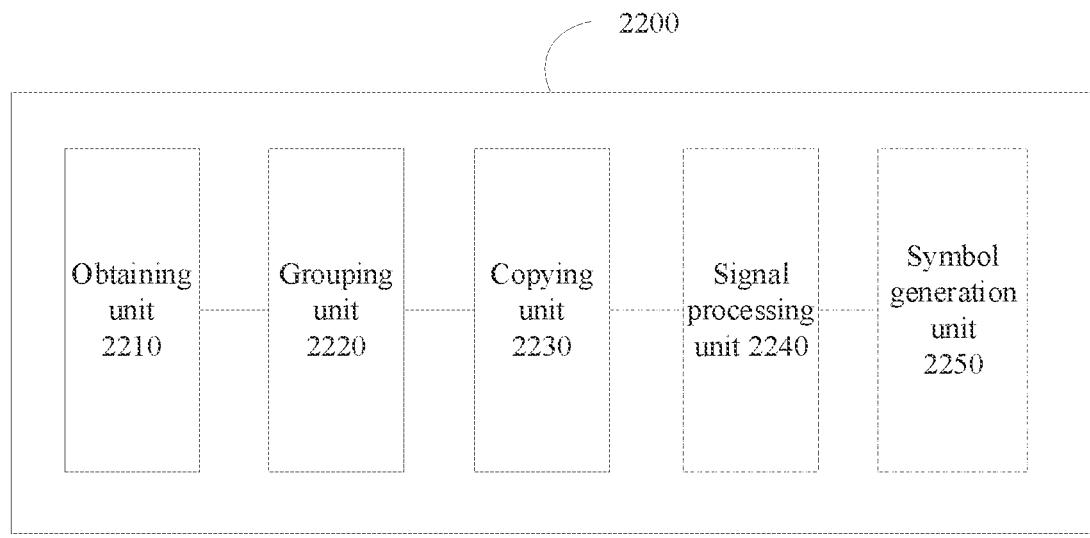
FIG. 22 is a schematic block diagram of a symbol processing apparatus according to an embodiment of this application.

As shown in FIG. 22, an embodiment of this application further provides a symbol processing apparatus 2200. The apparatus 2200 is configured to perform step S1210 to step S1240 in the foregoing method embodiment. Optionally, the apparatus 2200 is further configured to perform step S1250.

As shown in FIG. 22, the apparatus 2200 may include the following units:

an obtaining unit 2210, configured to perform step S1210;
a grouping unit 2220, configured to perform step S1220;

a copying unit 2230, configured to perform step S1230;

a signal processing unit 2240, configured to perform step S1250; and a symbol generation unit 2250, configured to perform step S1240.

Optionally, the obtaining unit 2210 may include a modulation subunit, configured to modulate a coded bit stream, to obtain a modulated symbol. The modulated symbol may also be referred to as a complex-valued symbol.

Optionally, the obtaining unit 2210 is configured to obtain, based on a PTRS sampling point and the modulated symbol, a plurality of complex-valued symbols for processing by the grouping unit 2220.

Figure 23:
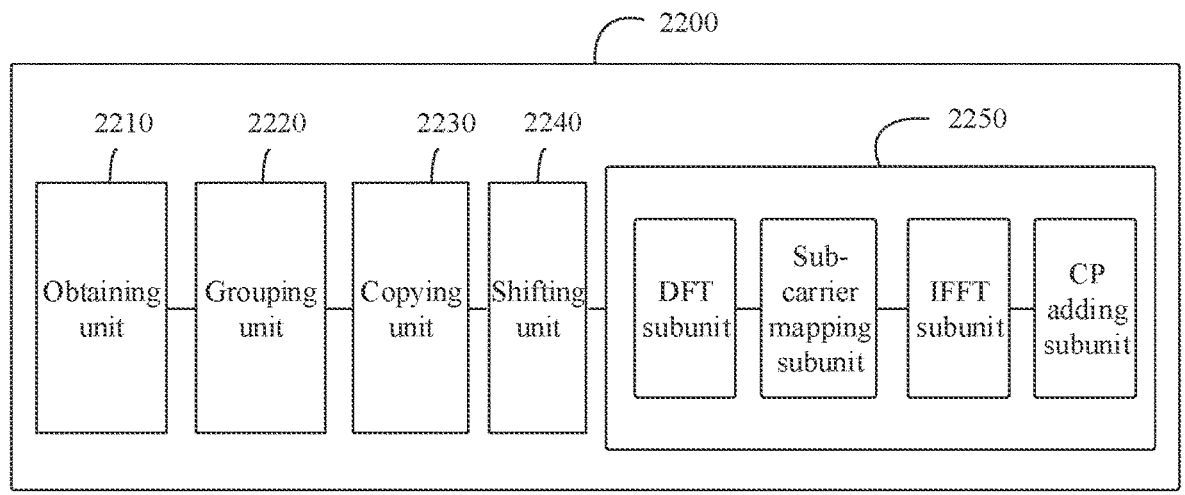
FIG. 23 is another schematic block diagram of a symbol processing apparatus according to an embodiment of this application.

Optionally, when the apparatus 2200 is applied to the application scenario 1, for example, as shown in FIG. 23, the symbol generation unit 2250 may include a DFT subunit, a subcarrier mapping subunit, an IFFT subunit, and a CP adding subunit.

In FIG. 23, the signal processing unit 2240 is located between the copying unit 2230 and the symbol generation unit 2250. In this case, the signal processing unit 2240 may be referred to as a cyclic shift unit.

Optionally, the signal processing unit 2240 may be located in the symbol generation unit 2250.

For example, the signal processing unit 2240 is located between the DFT subunit and the IFFT subunit. In this case, the signal processing unit 2240 may be referred to as a frequency domain weighting unit.

For another example, the signal processing unit 2240 is located between the IFFT subunit and the CP adding subunit. In this case, the signal processing unit 2240 may be referred to as a cyclic shift unit.

Figure 24:
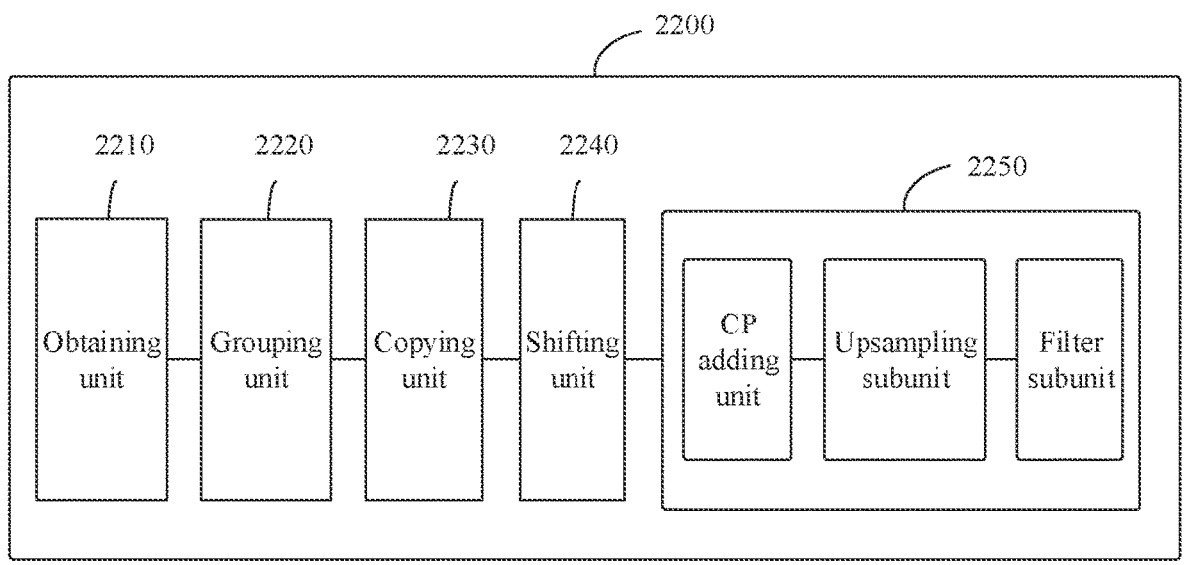
FIG. 24 is still another schematic block diagram of a symbol processing apparatus according to an embodiment of this application.

Optionally, when the apparatus 2200 is applied to the application scenario 2, for example, as shown in FIG. 24, the symbol generation unit 2250 may include a CP adding subunit, an upsampling subunit, and a filtering subunit. In this case, the signal processing unit 2240 may be referred to as a cyclic shift unit.

Optionally, the obtaining unit 2210, the grouping unit 2220, the copying unit 2230, and the signal processing unit 2240 (or the obtaining unit 2210, the grouping unit 2220, the copying unit 2230, the signal processing unit 2240, and the symbol generation unit 2250) may be implemented in a software manner, in a hardware manner, or in a hardware and software manner. In addition, the obtaining unit 2210, the grouping unit 2220, the copying unit 2230, and the signal processing unit 2240 (or the obtaining unit 2210, the grouping unit 2220, the copying unit 2230, the signal processing unit 2240, and the symbol generation unit 2250) may be different chips, or may be integrated into one chip or integrated circuit.

Optionally, in the foregoing embodiment, the obtaining unit 2210, the grouping unit 2220, the copying unit 2230, the signal processing unit 2240, and the symbol generation unit 2250 each may be implemented by using a processor or a processor-related circuit.

Figure 25:
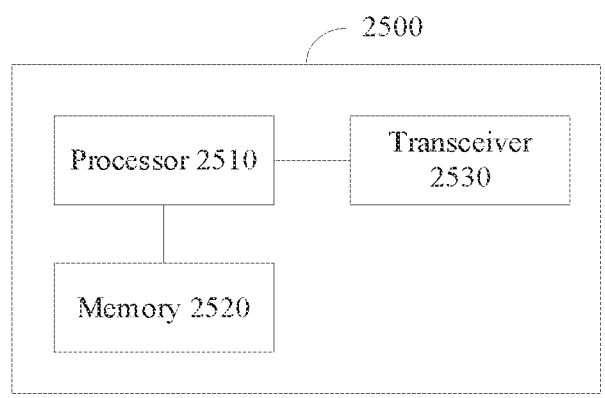
FIG. 25 is yet still another schematic block diagram of a symbol processing apparatus according to an embodiment of this application.

As shown in FIG. 25, an embodiment of this application further provides a symbol processing apparatus 2500. The apparatus 2500 includes a processor 2510, a memory 2520, and a transceiver 2530. The memory 2520 stores a program. The processor 2510 is configured to execute the program stored in the memory 2520. Execution of the program stored in the memory 2520 enables the apparatus 2500 to execute the foregoing method embodiment.

An embodiment of this application further provides a communication apparatus. The communication apparatus may be a terminal device or a chip. The communication apparatus may be configured to execute the foregoing method embodiments.

Figure 26:
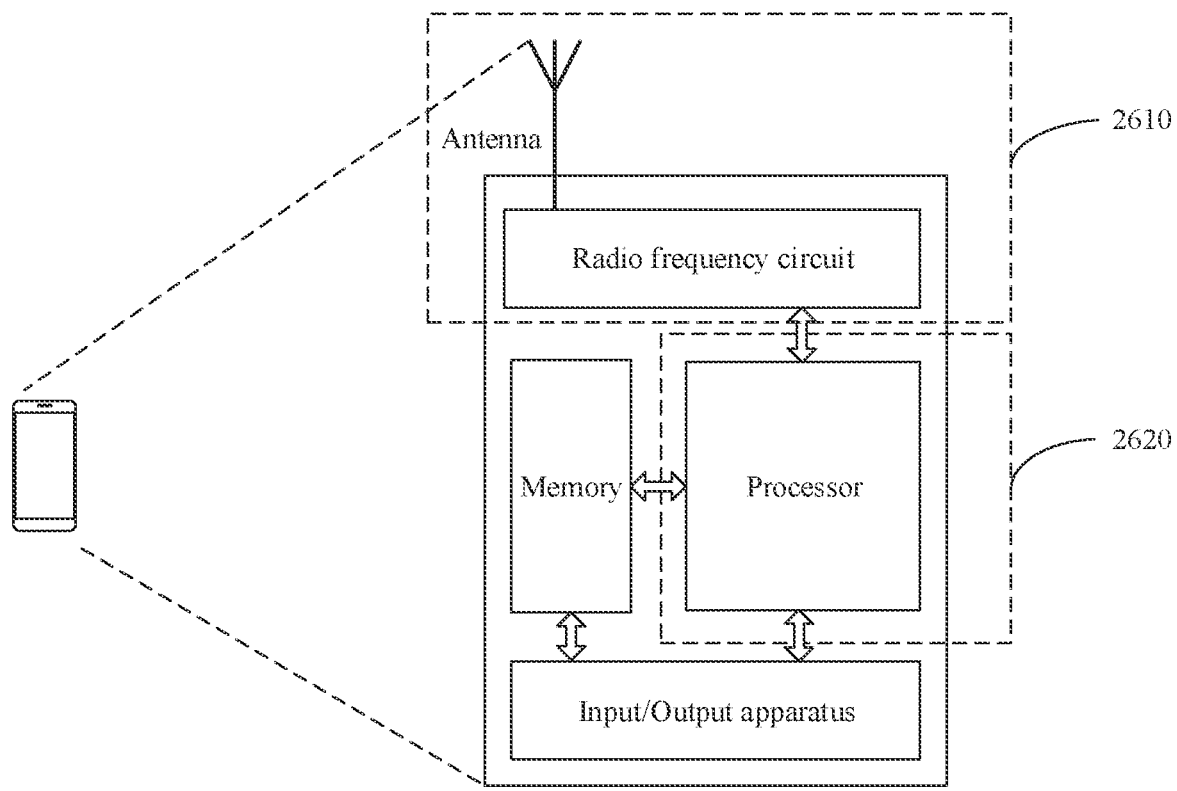
FIG. 26 is a schematic block diagram of a terminal device according to an embodiment of this application.

When the communication apparatus is a terminal device, FIG. 26 is a simplified schematic diagram of a structure of the terminal device. For ease of understanding and illustration, in FIG. 26, an example in which the terminal device is a mobile phone is used. As shown in FIG. 26, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display, or a keyboard, is mainly configured to receive data entered by a user, and output data to the user. It should be noted that some types of terminal devices may have no input/output apparatus.

When data needs to be sent, the processor performs baseband processing on the to-be-sent data, and outputs a baseband signal to the radio frequency circuit. The radio frequency circuit performs radio frequency processing on the baseband signal, and sends a radio frequency signal through the antenna in a form of an electromagnetic wave. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 26 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal device, and the processor that has a processing function may be considered as a processing unit of the terminal device.

As shown in FIG. 26, the terminal device includes a transceiver unit 2610 and a processing unit 2620. The transceiver unit 2610 may also be referred to as a transceiver, a transceiver machine, a transceiver apparatus, or the like. The processing unit 2620 may also be referred to as a processor, a processing board, a processing module, a processing apparatus, or the like. Optionally, a component that is in the transceiver unit 2610 and that is configured to implement a receiving function may be considered as a receiving unit, and a component that is in the transceiver unit 2610 and that is configured to implement a sending function may be considered as a sending unit. In other words, the transceiver unit 2610 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiver circuit, or the like. The sending unit sometimes may also be referred to as a transmitter machine, a transmitter, a transmitter circuit, or the like.

For example, in an implementation, the processing unit 2620 is configured to execute the foregoing method embodiments. The transceiver unit 2610 is configured to perform related receiving/sending operations in the foregoing method embodiments. For example, the transceiver unit 2610 is configured to send or receive a DFT-s-OFDM symbol or an SC-QAM symbol.

It should be understood that FIG. 26 is merely an example but not a limitation. The terminal device including the transceiver unit and the processing unit may not depend on the structure shown in FIG. 26.

When the communication apparatus is a chip, the chip includes a transceiver unit and a processing unit. The transceiver unit may be an input/output circuit or a communication interface. The processing unit may be a processor, a microprocessor, or an integrated circuit integrated on the chip.

An embodiment of this application further provides a communication apparatus. The communication apparatus may be a network device or a chip. The communication apparatus may be configured to execute the foregoing method embodiments. When the communication apparatus is a network device, for example, the communication apparatus is a base station.

Figure 27:
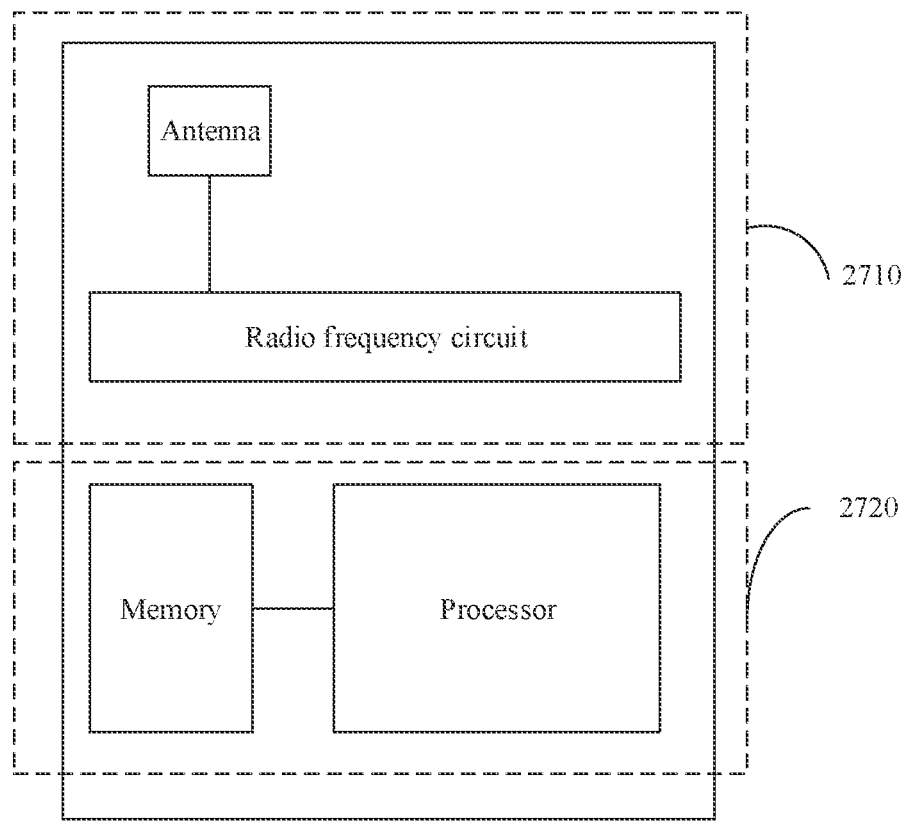
FIG. 27 is a schematic block diagram of a network device according to an embodiment of this application.

FIG. 27 is a simplified schematic diagram of a structure of a base station. The base station includes a part 2710 and a part 2720. The part 2710 is mainly configured to send and receive a radio frequency signal, and perform conversion between the radio frequency signal and a baseband signal. The part 2720 is mainly configured to perform baseband processing, control the base station, and the like. The part 2710 may be usually referred to as a transceiver unit, a transceiver machine, a transceiver circuit, a transceiver, or the like. The part 2720 is usually a control center of the base station, may be usually referred to as a processing unit, and is configured to control the base station to perform processing operations on a network device side in the foregoing method embodiments.

The transceiver unit of the part 2710 may also be referred to as a transceiver machine, a transceiver, or the like, and includes an antenna and a radio frequency unit. The radio frequency unit is mainly configured to perform radio frequency processing. Optionally, a component that is in the part 2710 and that is configured to implement a receiving function may be considered as a receiving unit, and a component that is in the part 2710 and that is configured to implement a sending function may be considered as a sending unit. In other words, the part 2710 includes the receiving unit and the sending unit. The receiving unit may also be referred to as a receiver machine, a receiver, a receiver circuit, or the like. The sending unit may be referred to as a transmitter machine, a transmitter, a transmit circuit, or the like.

The part 2720 may include one or more boards, and each board may include one or more processors and one or more memories. The processor is configured to read and execute a program in the memory to implement a baseband processing function and control the base station. If there are a plurality of boards, the boards may be interconnected to enhance a processing capability. In an optional implementation, the plurality of boards may share one or more processors, or the plurality of boards may share one or more memories, or the plurality of boards may simultaneously share one or more processors.

For example, in an implementation, the part 2720 is configured to execute the foregoing method embodiments. The part 2710 is configured to perform related receiving/sending operations in the foregoing method embodiments. For example, the part 2710 is configured to send or receive a DFT-s-OFDM symbol or an SC-QAM symbol.

It should be understood that FIG. 27 is merely an example but not a limitation. The network device including the transceiver unit and the processing unit may not depend on the structure shown in FIG. 27.

When the communication apparatus is a chip, the chip includes a transceiver unit and a processing unit. The transceiver unit may be an input/output circuit or a communication interface. The processing unit is a processor, a microprocessor, or an integrated circuit integrated on the chip.

The terminal device in embodiments of this application includes a handheld device, a vehicle-mounted device, a wearable device, or a computing device that has a wireless communication function. For example, the terminal device may be user equipment (UE), an access terminal, a subscriber unit, a subscriber station, a mobile station, a remote station, a remote terminal, a mobile device, a user terminal, a terminal, a wireless communication device, a user agent, or a user apparatus. For example, the terminal device may be a mobile phone, a tablet computer, or a computer with a wireless transceiver function. The terminal device may alternatively be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, or the like. The terminal device may be a terminal device in a 5G network, a terminal device in a future evolved public land mobile communication network (public land mobile network, PLMN), or the like.

The network device in embodiments of this application may be configured to communicate with one or more terminal devices, or may be configured to communicate with one or more base stations having some terminal functions (for example, communicate with a macro base station and a micro base station, for example, an access point). The network device may be referred to as a base station. The base station may be in a plurality of forms, for example, a macro base station, a micro base station, a relay station, and an access point. For example, the network device in embodiments of this application may be a base station in new radio (NR), a base transceiver station (BTS) in a global system for mobile communications (GSM) or code division multiple access (CDMA), a NodeB (NB) in a wideband code division multiple access (WCDMA) system, or an evolved NodeB (evolutional NodeB, eNB or eNodeB) in a long term evolution (LTE) system. The base station in 5G NR may also be referred to as a transmission reception point (TRP) or a next generation NodeB (gNB).

An embodiment of this application further provides a computer-readable storage medium. The computer-readable storage medium stores a computer program. When the computer program is executed by a computer, the computer is enabled to implement the foregoing method embodiments.

An embodiment of this application further provides a computer program product including instructions. When the instructions are executed by a computer, the computer is enabled to implement the foregoing method embodiments.

For explanations and beneficial effects of related content of any communication apparatus provided above, refer to corresponding method embodiments provided above. Details are not described herein again.

In embodiments of this application, the terminal device or the network device includes a hardware layer, an operating system layer running at the hardware layer, and an application layer running at the operating system layer. The hardware layer includes hardware such as a central processing unit (CPU), a memory management unit (MMU), and a memory (which may also be referred to as a main memory). The operating system may be any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of the method provided in embodiments of this application is not specifically limited in embodiments of this application, provided that a program that records code of the method provided in embodiments of this application can be run to perform communication according to the method provided in embodiments of this application. For example, the execution body of the method provided in embodiments of this application may be the terminal device or the network device, or a function module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD), a digital versatile disc (DVD)), a smart card, and a flash component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a radio channel and various other media that can store, include, and/or carry instructions and/or data.

It should be understood that the processor mentioned in embodiments of this application may be a central processing unit (CPU), or may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It should further be understood that the memory mentioned in embodiments of this application may be a volatile memory or a non-volatile memory, or may include both a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct Rambus random access memory (Direct Rambus RAM, DR RAM).

It should be noted that, when the processor is a general-purpose processor, a DSP, an ASIC, an FPGA or another programmable logic device, a discrete gate, a transistor logic device, or a discrete hardware component, the memory (storage module) is integrated into the processor.

It should be noted that the memory described in this specification is intended to include, but is not limited to, these memories and any memory of another proper type.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A symbol processing apparatus, comprising:
   a transceiver;
   at least one processor; and
   one or more memories coupled to the at least one processor and storing programming instructions for execution by the at least one processor to:
      generate a first symbol in a symbol sequence, wherein the first symbol and a second symbol have a same first symbol component, a start location of the first symbol component in the first symbol is a start location of the first symbol, a start location of the first symbol component in the second symbol is a location at which a cyclic prefix is truncated in the second symbol, the second symbol is a next symbol adjacent to the first symbol, and the first symbol and the second symbol each has a cyclic prefix, wherein the first symbol component in the first symbol is absent from the cyclic prefix of the first symbol, and wherein the first symbol component in the second symbol is absent from the cyclic prefix of the second symbol; and
      send, by the transceiver, the first symbol.

2. The apparatus according to claim 1, wherein the first symbol is the $1^{st}$ symbol in the symbol sequence.

3. The apparatus according to claim 1, wherein the programming instructions are for execution by the at least one processor to:
   generate a third symbol in the symbol sequence, wherein the third symbol and a fourth symbol have a same second symbol component, an end location of the second symbol component in the third symbol is a location at which a cyclic prefix is truncated in the third symbol, an end location of the second symbol component in the fourth symbol is an end location of the fourth symbol, the fourth symbol is a previous symbol adjacent to the third symbol, and the third symbol and the fourth symbol each has a cyclic prefix; and
   send, by the transceiver, the third symbol.

4. The apparatus according to claim 1, wherein the symbol sequence comprises a plurality of sub symbols obtained through processing based on a single symbol.

5. The apparatus according to claim 4, wherein at least one subsymbol in the symbol sequence is a channel demodulation reference signal.

6. The apparatus according to claim 1, wherein the programming instructions are for execution by the at least one processor to:
   obtain a plurality of complex-valued symbols;
   divide the plurality of complex-valued symbols into a plurality of sets, wherein each set corresponds to one symbol, and the plurality of sets comprise a first set corresponding to the first symbol and a second set corresponding to the second symbol;
   perform a copying operation on the first set and the second set to cause the first set and the second set to have a part of same complex-valued symbols; and
   generate the first symbol based on the first set.

7. The apparatus according to claim 6, wherein the symbol sequence comprises a plurality of subsymbols obtained through processing based on a single symbol, and wherein when the first symbol is not the $1^{st}$ symbol in the symbol sequence, the cyclic prefix of the first symbol is added before discrete Fourier transformation (DFT) is performed on the first set.

8. The apparatus according to claim 6, wherein the symbol sequence comprises a plurality of subsymbols obtained through processing based on a single symbol, and wherein when the first symbol is the $1^{st}$ symbol in the symbol sequence, the cyclic prefix of the first symbol is added after discrete Fourier transformation (DFT) is performed on the first set.

9. A symbol processing apparatus, comprising:
   a transceiver;
   at least one processor; and
   one or more memories coupled to the at least one processor and storing programming instructions for execution by the at least one processor to:
      determine a first receive window used to receive a first symbol in a symbol sequence, wherein the first symbol and a second symbol have a same first symbol component, a start location of the first symbol component in the first symbol is a start location of the first symbol, a start location of the first symbol component in the second symbol is a location at which a cyclic prefix is truncated in the second symbol, the second symbol is a next symbol adjacent to the first symbol, and the first symbol and the second symbol each has a cyclic prefix, wherein the first symbol component in the first symbol is absent from the cyclic prefix of the first symbol, and wherein the first symbol component in the second symbol is absent from the cyclic prefix of the second symbol;
      adjust, as an adjusted first receive window, start time of the first receive window to completely receive the first symbol in the first receive window; and
      receive, by the transceiver, the first symbol by using the adjusted first receive window.

10. The apparatus according to claim 9, wherein the programming instructions are for execution by the at least one processor to shift the start time of the first receive window backward by a first step, and the first step is not greater than a length of the first symbol component.

11. The apparatus according to claim 9, wherein the first symbol is the $1^{st}$ symbol in the symbol sequence.

12. The apparatus according to claim 9, wherein the programming instructions are for execution by the at least one processor to:
   determine a third receive window used to receive a third symbol in the symbol sequence, the third symbol and a fourth symbol have a same second symbol component, an end location of the second symbol component in the third symbol is a location at which a cyclic prefix is truncated in the third symbol, an end location of the second symbol component in the fourth symbol is an end location of the fourth symbol, the fourth symbol is a previous symbol adjacent to the third symbol, and the third symbol and the fourth symbol each has a cyclic prefix; and receive, by the transceiver, the third symbol by using the third receive window.

13. The apparatus according to claim 9, wherein the symbol sequence comprises a plurality of sub symbols obtained through processing based on a single symbol.

14. The apparatus according to claim 13, wherein at least one subsymbol in the symbol sequence is a channel demodulation reference signal.

15. A symbol processing apparatus, comprising:
a transceiver;
at least one processor; and
one or more memories coupled to the at least one processor and storing programming instructions for execution by the at least one processor to:
  generate a first subsymbol in a symbol sequence, wherein the symbol sequence comprises a plurality of subsymbols obtained through processing based on a single symbol; and
  send, by the transceiver, the first subsymbol, wherein at least one of the following occurs:
    the first subsymbol and a second subsymbol have a same first symbol component, a start location of the first symbol component in the first subsymbol is a start location of the first subsymbol, a start location of the first symbol component in the second subsymbol is a location at which a cyclic prefix is truncated in the second subsymbol, the second subsymbol is a next symbol adjacent to the first subsymbol, and the first subsymbol and the second subsymbol each has a cyclic prefix, wherein the first symbol component in the first subsymbol is absent from the cyclic prefix of the first subsymbol, and wherein the first symbol component in the second subsymbol is absent from the cyclic prefix of the second subsymbol; or
    the first subsymbol and a third subsymbol have a same second symbol component, an end location of the second symbol component in the first subsymbol is a location at which a cyclic prefix is truncated in the first subsymbol, an end location of the second symbol component in the third subsymbol is an end location of the third subsymbol, the third subsymbol is a previous symbol adjacent to the first subsymbol, and the first subsymbol and the third subsymbol each has a cyclic prefix, wherein the second symbol component in the first subsymbol is absent from the cyclic prefix of the first subsymbol, and wherein the second symbol component in the third subsymbol is absent from the cyclic prefix of the third subsymbol.

16. The apparatus according to claim 15, wherein the first subsymbol is the $1^{st}$ subsymbol in the symbol sequence.

17. The apparatus according to claim 15, wherein when the first subsymbol is not the $1^{st}$ subsymbol in the symbol sequence, the first subsymbol does not comprise the first symbol component.

18. The apparatus according to claim 15, wherein the programming instructions are for execution by the at least one processor to:
  obtain a plurality of complex-valued symbols;
  divide the plurality of complex-valued symbols into a plurality of sets, wherein each set corresponds to one symbol, and the plurality of sets comprise a first set corresponding to the first subsymbol and a second set corresponding to the second subsymbol;
  perform a copying operation on the first set and the second set to cause the first set and the second set to have a part of same complex-valued symbols; and
  generate the first subsymbol based on the first set.

19. The apparatus according to claim 18, wherein when the first subsymbol is not the $1^{st}$ subsymbol in the symbol sequence, the cyclic prefix of the first sub symbol is added before discrete Fourier transformation (DFT) is performed on the first set.

20. The apparatus according to claim 18, wherein when the first subsymbol is the $1^{st}$ subsymbol in the symbol sequence, the cyclic prefix of the first subsymbol is added after discrete Fourier transformation (DFT) is performed on the first set.

* * * * *